United States Patent
Yasue et al.

(10) Patent No.: US 7,103,028 B1
(45) Date of Patent: Sep. 5, 2006

(54) RADIO COMMUNICATION SYSTEM, AND GATEWAYS, RADIO INTELLIGENT TERMINALS AND RADIO COMMUNICATION METHODS APPLIED THERETO

(75) Inventors: Reiko Yasue, Aichi-ken (JP); Noritake Okada, Kanagawa-ken (JP); Nobukazu Ohnishi, Aichi-ken (JP); Hirohisa Ozaki, Aichi-ken (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 09/356,350

(22) Filed: Jul. 19, 1999

(30) Foreign Application Priority Data

Jul. 17, 1998 (JP) .................................. 10-203006
Sep. 29, 1998 (JP) .................................. 10-274938

(51) Int. Cl.
*H04Q 7/24* (2006.01)
(52) U.S. Cl. ........................................ 370/338; 370/401
(58) Field of Classification Search ................ 370/328, 370/338, 349, 389, 400, 401, 329; 455/450, 455/556.1, 556.2
See application file for complete search history.

(56) References Cited

U.S. PATENT DOCUMENTS

| | | | | |
|---|---|---|---|---|
| 5,276,680 A | * | 1/1994 | Messenger | 370/311 |
| 5,457,680 A | * | 10/1995 | Kamm et al. | 370/332 |
| 5,812,819 A | * | 9/1998 | Rodwin et al. | 703/23 |
| 5,970,059 A | * | 10/1999 | Ahopelto et al. | 370/338 |
| 5,991,287 A | * | 11/1999 | Diepstraten et al. | 370/338 |
| 6,104,929 A | * | 8/2000 | Josse et al. | 455/445 |
| 6,122,293 A | * | 9/2000 | Frodigh et al. | 370/473 |
| 6,137,783 A | * | 10/2000 | Sallberg | 370/316 |
| 6,154,461 A | * | 11/2000 | Sturniolo et al. | 370/401 |
| 6,400,954 B1 | * | 6/2002 | Khan et al. | 455/450 |
| 6,545,988 B1 | * | 4/2003 | Skog | 370/329 |

FOREIGN PATENT DOCUMENTS

| | | |
|---|---|---|
| JP | 8-6887 | 1/1996 |
| JP | 2773424 | 4/1998 |

* cited by examiner

*Primary Examiner*—Bob A. Phunkulh
(74) *Attorney, Agent, or Firm*—McDermott Will & Emery LLP

(57) ABSTRACT

The present invention is applied to the case that in a communication system establishing the communication between a radio intelligent terminal and a server via gateway, it is necessary to exchange from a gateway to be used originally to other gateway because of any reason. First, it is arranged in this invention that at receiving a gateway exchange instruction an information notifying means may notify a radio intelligent terminal of the generation of gateway exchange. In case of notifying only the gateway exchange, the above information in addition to the exchange notice can contains information necessary for the communication between the radio intelligent terminal and the server via exchange-destination gateway, for example, the exchange-destination gateway address.

26 Claims, 27 Drawing Sheets

RADIO COMMUNICATION SYSTEM, AND GATEWAYS, RADIO INTELLIGENT TERMINALS AND RADIO COMMUNICATION METHODS APPLIED THERETO

BACKGROUND OF THE INVENTION

1. Field of the Invention

This invention relates to a radio communication system, more specially, gateway exchange methods for said system, and gateways, radio intelligent terminals and radio communication system applied to said method.

2. Description of the Prior Art

As Internet services such as WWW (World Wide Web) and etc. are rapidly widespread in recent years, the expansion of computer network scale and the diversity of said connecting mode are now in progress.

In order to meet said progress, the gateways which connect intelligent terminals and servers via network are required to improve the processing performance and to increase the functions.

A mobile computing is shown as an example of the diversity of connecting mode. The mobile computing is a radio communication network which is able to communicate with a computer network by using a mobile terminal network such as portable phone network adding an intelligent terminal with a radio communication function even at moving just now or even at a place impossible to connect.

FIGS. 5 and 6 are conceptual view showing the communication mode adopting the above radio communication network FIG. 5 shows a constitution of the radio communication network with public network or in-house network for example, Local Area Network (LAN).

When an user is going to execute an application in a terminal 1, the communication is performed between the terminal 1 and a sever 6 passing through a radio base station 2, a network 3, and a gateway 11 or 12. And the application is executed.

FIG. 6 shows an example of a radio communication network wherein gateways themselves have a server function, without passing through a network operated in comparatively small area such as an office, for example, shown in FIG. 5. Namely, the communication is performed between the terminal 1 and the gateway 11 or 12 via radio base station 2 and the application is to be executed.

In the radio communication network as described above, it is necessary to expand functions of gateways to meet the change of networks and to stop the operation of gateways temporarily for regular maintenance and so on. In order to continue the network operation even at the stop of the gateway, the gateway connect exchange function is required to the network, that is, a plural gateways are to be prepared as shown in FIGS. 5 and 6, and when the a gateway 11 stops, the communication is to be performed between the terminal and the server through other gateway 12.

The outline of the communication protocol between the terminal and the gateway will be explained according to FIG. 7.

An application 71 in the terminal is a program such as WWW browser that an user operates directly. And an application 75 in the gateway (shown in an example in FIG. 6 as gateway including server function) is a program for sending and receiving information with an application in the terminal, for example, a WWW server software.

A session layer protocol 72 is a protocol for offering a transfer controlling function which is common to various applications 71 and 75, for example, a means such as a transfer processing of dividing into a transferable data and of transferring per divided unit. And a management entity at management entity 73 is a program for managing system resources (such as a memory) used by a plural session processes which occurs at the data communication between a terminal and a server, and for managing processings over the whole system (for example, notice of a gateway exchange timing). A lower protocol 74 is a program and device for performing a communication control.

FIG. 8 shows the communication sequence in the communication mode.

A session layer protocol 802 in a terminal 1 is in communication 803 with a session layer protocol 804 in the gateway 11 in order to execute the application 801. At this time, an gateway exchange instruction 808 is issued by an operator to a management entity 805 in the gateway 11, and the management entity 805 sends a disconnect notice 809 to the session layer protocol 802 in the terminal 1 via the session layer protocol 804. Accordingly the session layer protocol 802 in the terminal 1 performs the disconnect display 810 to the application 801 or not, and then the execution of the application 801 is suspended.

After the gateway 11 sends out the disconnect notice 809, the gateway 11 stops according to the operator's instruction or, the function of the gateway 11. After that, the terminal 1, in order to re-execute the application 801 thus suspended, requests the session layer protocol 802 to re-connect 811 with the gateway 12 according to the information in itself.

After the session 812 is established between the session layer protocol 802 and the session layer protocol 806 in the gateway 12, the state gets to be in communication 813 and it becomes possible to re-execute the suspended application 801.

In the conventional technique as described above, however, there is a problem as follows. Namely, when the gateway connect exchange is performed because of the stop of gateway, the terminal has to finish the executing application temporarily and then re-execute the application from the beginning after re-connecting with other gateway.

And in order to re-execute the application by the the terminal after exchanging the gateway as described, it is necessary to store beforehand in the terminal the address information about a plural gateways to be changeable objects. But it means that the information necessary only for exchanging the connection of gateway are always stored in the terminal, which is equivalent to the wasteful use of resources. And this is another problem for the terminal required to be compact and have many functions.

And further problem is that, whenever it occurs that the network constitution changes by the addition, the delete and etc. of servers or gateways, the address information of the gateway stored in the terminal have to be updated. And when the connection exchanges to other gateway, it is necessary that the information such as terminal port number, terminal address and terminal capability must be negotiated between the terminal and the exchange-destination gateway. As it takes much time for the negotiation, there is a long time before the application is re-executed. This is a problem too.

And as a result of the negotiation between the terminal and the exchange-destination gateway, if said gateway does not have a capacity or resource able to accommodate the communication facility (capability) of the terminal, the terminal finishes the connection with the gateway. And the terminal tries to connect with other gateway again and again till it can find out the gateway able to accommodate the communication capability of the terminal, which is very bad in operation efficiency. But there is a possibility that these conditions will happen, and this is also a problem.

The present invention is proposed in order to solve and improve the above problems. And the object of the present invention is to provide an automatic gateway exchanging method and device wherein it is possible to exchange the connecting gateway without finishing an application executed in a terminal, it is not necessary for a terminal to always keep information of a plural gateway, it is easy for a terminal to meet various changes of network constitution, it is possible to shorten a time for the negotiation of connecting a terminal to a gateway, and it is possible to connect at a time a terminal to a gateway with a resource and capability accommodating the terminal.

SUMMARY OF THE INVENTION

To achieve the above object, the present invention adopts the following arrangement.

The present invention is applied to the case that in a communication system establishing the communication between a radio intelligent terminal and a server via gateway, it is necessary to exchange from a gateway to be used originally to other gateway because of any reason.

First, it is arranged in this invention that at receiving a gateway exchange instruction an information notifying means may notify a radio intelligent terminal of the generation of gateway exchange.

In case of notifying only the gateway exchange, the above information in addition to the exchange notice can contains information necessary for the communication between the radio intelligent terminal and the server via exchange-destination gateway, for example, the exchange-destination gateway address.

In case of notifying the terminal of the information necessary for the communication with the server via exchange-destination gateway, a restart activating means in the radio intelligent terminal executes a restart sequence for the communication with the exchange-destination gateway instead of suspending the communication with the exchange-original gateway. It can occur that the exchange notice is sent from the exchange-original gateway when the radio intelligent terminal does not receive services from the server. At this time, a communication activating means in the radio intelligent terminal starts the communication with the server via the exchange-destination gateway.

At the time of the gateway exchange, it is possible for the exchange-original gateway to transmit in advance the information necessary for the communication with the radio intelligent terminal to the exchange-destination gateway by an information exchanging means and receive the confirmation of the permission to start the communication from the exchange-destination gateway.

In case that there is an information exchanging means between gateways, the exchange-original gateway can transmit to the exchange-destination gateway the capability together with the address of the radio intelligent terminal. Thereby, the exchange-destination gateway, if its own capability is inferior and not able to accommodate the terminal, informs the exchange-original gateway of the maximum of its own capability.

After the exchange-original gateway informs the radio intelligent terminal of the maximum of capability, the radio intelligent terminal restarts the communication via the exchange-destination gateway under the conditions of said maximum of capability. If the communication cannot be performed under the conditions of said maximum of capability, the communication is to be suspended based on the judgment means in the exchange-original gateway or the judgment means in the radio intelligent terminal.

But there is a possibility that an incomplete transaction is left at the suspend processing.

In case of the gateway without the information exchange means, the exchange-original gateway informs the server corresponding to the exchange-destination gateway of the respondent (the radio intelligent terminal) address before the restart instruction of the radio intelligent terminal. Thereby, the incomplete transaction at the time of restart is to be completed. In case of the gateway with the information exchange means, the exchange-original gateway informs the exchange-destination gateway of the transaction conditions, thereby the incomplete transaction at the time of restart is to be completed.

It can occur that the communication condition between the radio intelligent terminal and the server changes before and after the exchanging of information. At this time, according to the restart sequence, the latest communication conditions are to be sent to the exchange-destination gateway.

The terms described above in the present invention will be interpreted as following explanations, and also in the drawings are the same.

The information notifying means: an exchange instruction is given from an operator of a gateway to an exchange-original gateway. The management entity in the exchange-original gateway receives the exchange instruction, edits the contents of notice to a radio intelligent terminal, and informs the radio intelligent terminal of the contents of notice via the session layer protocol. Therefore, the information notifying means is composed of the management entity and the session layer protocol in a gateway.

The information exchanging means: which is included in the exchange-original gateway and the exchange-destination gateway respectively, and executes the exchange of information, such as the radio intelligent terminal address, between the management entities mutually. As it is needless to say that the edit of the contents of notice is performed by the management entity, the information exchanging means is also composed of the management entity. In the drawings, the information exchange is to be made between the management entities, but it may be arranged that the information exchange is executed between the session layer protocols of both gateways. Even in this case, the exchanged information is supplied from the management entity to the session layer protocol.

The restart activating means: at receiving the information such as the exchange-destination gateway address, the session layer protocol in the radio intelligent terminal executes the restart sequence after performing the suspend processing of the communication with the exchange-original gateway. Therefore, the restart activating means is composed of the session layer protocol in the radio intelligent terminal. But the communication activating means does not execute the suspend processing which is different from the restart activating means. And in this case, the communication activating means is also composed of the session layer protocol.

The judgment means: as described above, said means judges whether the communication between the radio intelligent terminal and the exchange-destination gateway can be performed by comparing the capability of the radio intelligent terminal with of the exchange-destination gateway. There are two cases that said means is included in the radio intelligent terminal and in the exchange-destination gateway. In both case, the management entity is to perform the judgement.

DESCRIPTION OF THE PREFERRED EMBODIMENT

The embodiments of the present invention will be explained hereinafter.

Embodiment 1

Figure 1:
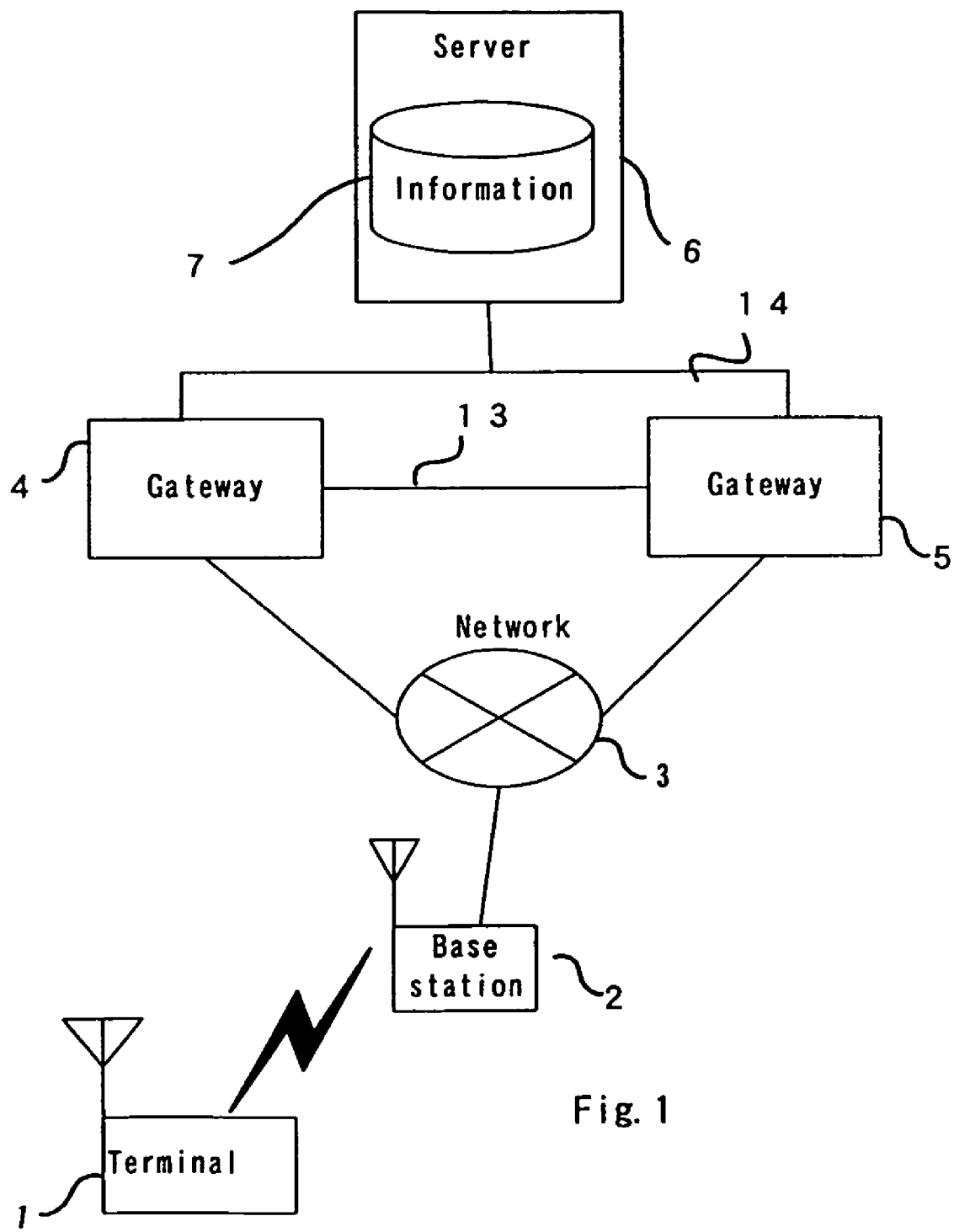
FIG. 1 is a constitutional view of a radio communication network via public network or in-house network with gateways sharing a common server in the embodiment of this invention

FIG. 1 shows the constitution of a radio communication network with gateways having a common server via public network in this embodiment of the present invention.

A terminal 1 is a radio intelligent terminal such as a notebook-type personal computer connected with a portable phone. A base station 2 is a base station for portable phone. And a network 3 is a public network for portable phone.

A gateway 4 shares a server 6 with a gateway 5. The server 6 is connected with the network 3 via the gateway 4 and 5. And the gateway 4 and 5 are provided with a information exchanging means for performing the negotiation between gateways in this invention. The information exchanging means includes a connecting means 13 in cable or radio which makes it possible to communicate with the gateway 4 and 5 directly, otherwise a connecting means 14 among the server 6, the gateway 4 and 5 or the connection passing through the network 3 can be used as said means.

The terminal 1 is connected with the server 6 via the base station 2, the network 3 and the gateway 4 or 5. Under these conditions, the application is executed by using the information 7 bearing with the server 6.

Figure 9:
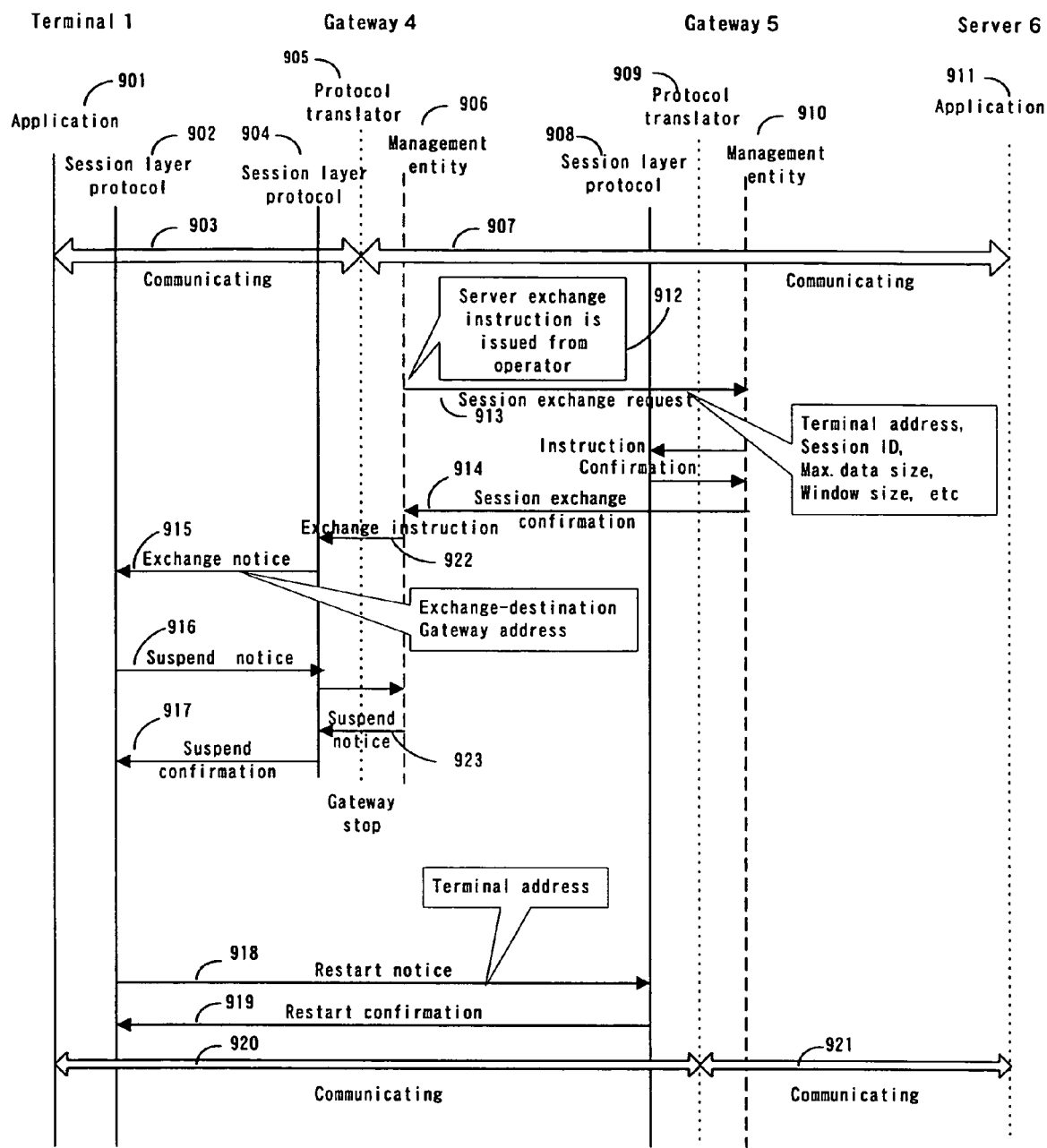
FIG. 9 shows a sequence of the gateway exchange in the embodiment of this invention under the constitution shown in FIG. 1.

Because the gateway 4 stops while the terminal 1 is being connected with the server 6 via the gateway 4, the gateway 4 should be changed to the gateway 5. FIG. 9 shows a sequence of switching from gateway 4 to gate 5 after the gateway 4 stops.

A session layer protocol 902 in the terminal 1 gets into communication with the application 911 in the server 6 via gateway 4 in order to execute the application 901.

At this time, as the communication protocol used in the communication 903 between the session layer protocol 902 in the terminal 1 and the session layer protocol 904 in the gateway 4 is different from that of the communication 907 between the session layer protocol 904 in the gateway 4 and the server 6, a protocol tranlator 905 in the gateway 4 performs the protocol translation. Namely, the communication protocol used in the communication 903 is translated to that used in the communication 907 between the gateway 4 and the server 6 by the protocol tranlator 905. Therefore, it is possible to perform the communication between the terminal 1 and the server 6.

But there is applications which do not require the protocol translation, in this case, the protocol translation in the gateway does not be performed.

Under these conditions, if the server exchange instruction 912 is issued from the operator while the terminal 1 is in communication with the server 6, the management entity 906 in the gateway 4 performs the negotiation with the management entity 910 in the gateway 5 in order to translate the communication of the terminal 1 from the gateway 4 to the gateway 5.

That is to say, the management entity 906 in the gateway 4 sends the session exchange request 913 to the management entity 910 in the gateway 5. At this time, the selection of a exchange-destination gateway (that is, the gateway 5) receiving the session exchange request 913 from the gateway 4 can be performed according to the information of the other gateway stored in the gateway 4 in advance, or according to the operator's instruction. The session exchange request 913 is to be sent to the management entity 910 in the gateway 5 together with the information such as the address, session ID, maximum data size and window size of the terminal which is connected now.

The management entity 910 in the gateway 5 handles the information together with the session exchange request 913 to the session layer protocol 908. When the session layer protocol 908 confirms the contents of the information, it becomes the state that the session exchange can be performed. And the management entity 910 in the gateway 5 sends the session exchange confirmation 914 to the management entity 906 in the gateway 4.

The management entity 906 in the gateway 4, after receiving the session exchange confirmation 914, sends the exchange instruction 922 to the session layer protocol 904. The session layer protocol 904 received the exchange instruction 922 sends the exchange-destination gateway address together with the exchange notice 915 to the session layer protocol 902 in the terminal 1.

Accordingly, the terminal 1 can obtain the address information of the gateway 5 of the exchange-destination gateway by the exchange notice 915.

The protocol session layer 902 in the terminal 1, after receiving the exchange notice 915 together with the address information, sends the suspend notice 916 to the session layer protocol 904 in the gateway 4 at convenient timing for suspending the session, for example, at the time that the executing application 901 is not in communication with the application 911 in the server 6.

The session layer protocol 904 in the gateway 4 informs the management entity 906 of the receipt of the suspend notice 916, and the management entity 906 sends the suspend instruction 923 to the session layer protocol 904. Accordingly, the session layer protocol 904 sends the suspend confirmation 917 to the session layer protocol 902 in the terminal 1, and then the session of the terminal 1 is suspended.

But the terminal 1, after sending the suspend notice 916 to the session layer protocol 904 in the gateway 4, can continue the server connect exchange sequence regardless to the state of the gateway 4.

Therefore, the steps of the suspend instruction 923 and the suspend confirmation 917 may be omitted. And without the suspend instruction 923, the session layer protocol 904 may send the suspend confirmation 917 to the session layer protocol 902 in the terminal 1 independently. There is a case that in the type of the gateway 4 only the suspend instruction 923 is sent out and the suspend confirmation 917 is not sent out. In both case, if there is not the suspend confirmation 917, the session of the terminal 1 is suspended after sending the suspend notice 916.

When the session layer protocol 902 in the terminal 1 receives the exchange notice 915, the application 901 is instructed to perform the gateway exchange display. And according to the function of the application 901 or the instruction of the user, the session layer protocol 902 in the terminal 1 may send the suspend notice 916 to the session layer protocol 904 in the gateway 4.

After that, the session layer protocol 902 in the terminal 1 sends the restart notice 918 including the information such as the terminal address and so on to the session layer protocol 908 in the gateway 5. At this time, as the session layer protocol 908 in the gateway 5 has been ready for restarting the session according to the session exchange request 913 and the session exchange confirmation 914, the restart confirmation 919 is sent to the terminal 1 as soon as the restart notice 918 from the session layer protocol 902 in the terminal is received.

According to the restart confirmation 919 from the session layer protocol 908 in the gateway 5, the session of the terminal 1 which has been suspended starts again at once. Therefore, it is possible to establish the communication 920 and 921 with the session layer protocol 902 in the terminal 1 and the application 911 in the server 6 via the protocol tranlator 909 in the gateway 5 in order to execute the application 901.

Figure 18:
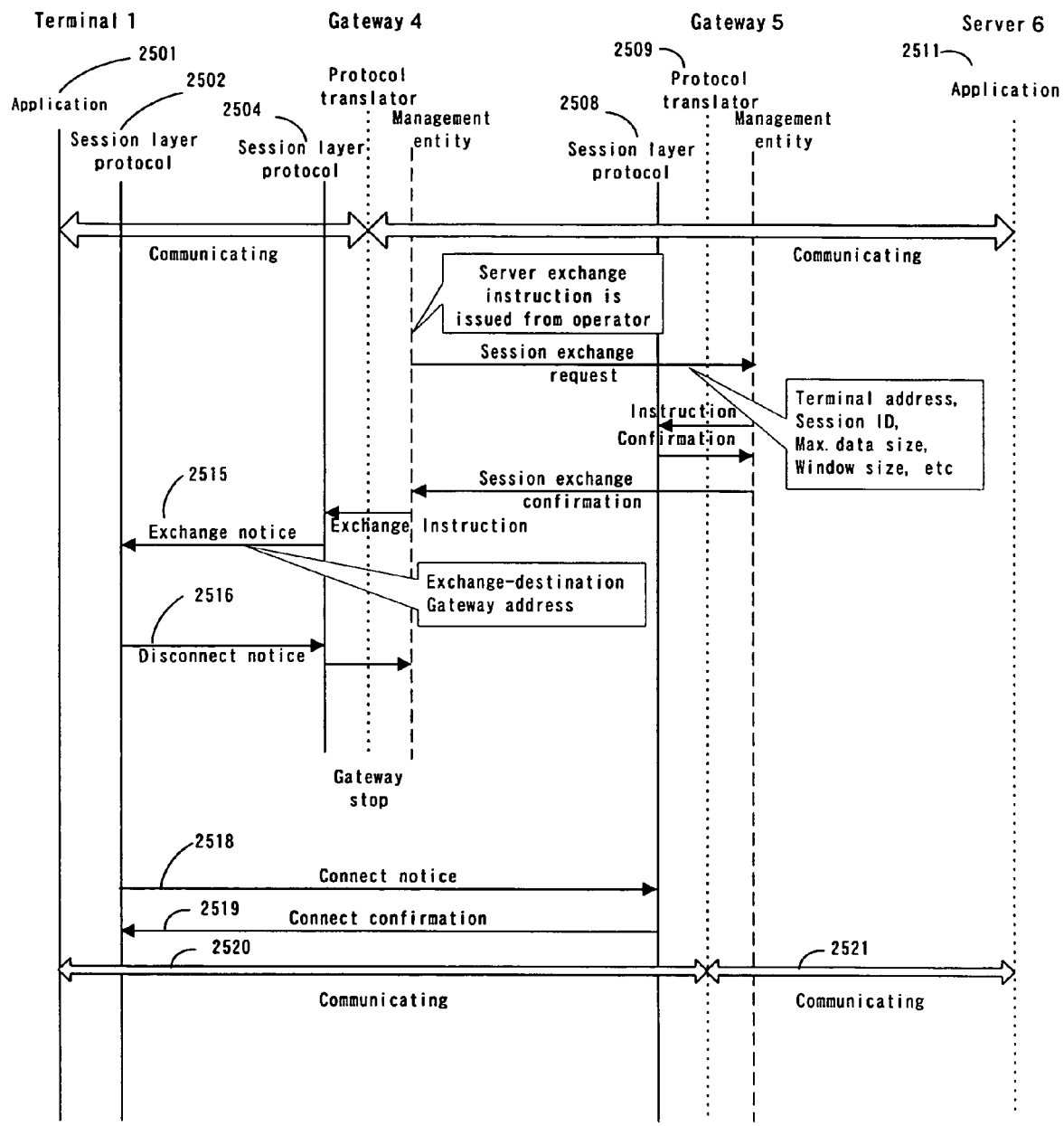
FIG. 18 shows a sequence for the gateway exchange in the embodiment of this invention under the constitution shown in FIG. 1.

FIG. 18 shows a sequence in case of using "disconnect" instead of the above "suspend", and "disconnect" instead of the above "restart".

An exchange notice 2515 in FIG. 18 corresponds to the exchange notice 915 in the sequence of FIG. 9, and the sequence up to this step is quite same in both drawing, which explanation will be omitted. After this, the session layer protocol 2502 in the terminal 1 disconnects the session after sending out the disconnect notice 2516.

Next, according to the exchange-destination gateway address sent to the terminal 1 together with the exchange notice 2515, the session layer protocol 2502 in the terminal 1 sends the connect notice 2518 to the protocol session layer 2508 in the gateway 5. The protocol session layer 2508 in the gateway 5 regards said connect notice as a new session, and sends the connect confirmation 2519 to the session layer protocol 2508 in the terminal 1. Accordingly, the session layer protocol 2502 in the terminal 1 may confirms the establishment of the session.

After establishing the session, the session layer protocol 2502 in the terminal 1 is in communication 2520 and 1021 with the application 2511 in the sever 6 via the protocol exchanging 2509 in the gateway in order to execute the application 2501.

According to the sequences described above, it is possible to perform the gateway connect exchange of the terminal 1 in a short time, and also to perform the gateway connect exchange without much influences on the application 901 (2501) in the terminal and an user.

In other words, it is possible to resume the application right from where it left before the gateway exchange takes place, without going through the application all over again from the beginning because the gateway 5 obtains necessary information by the negotiation procedure mentioned above.

Embodiment 2

Figure 2:
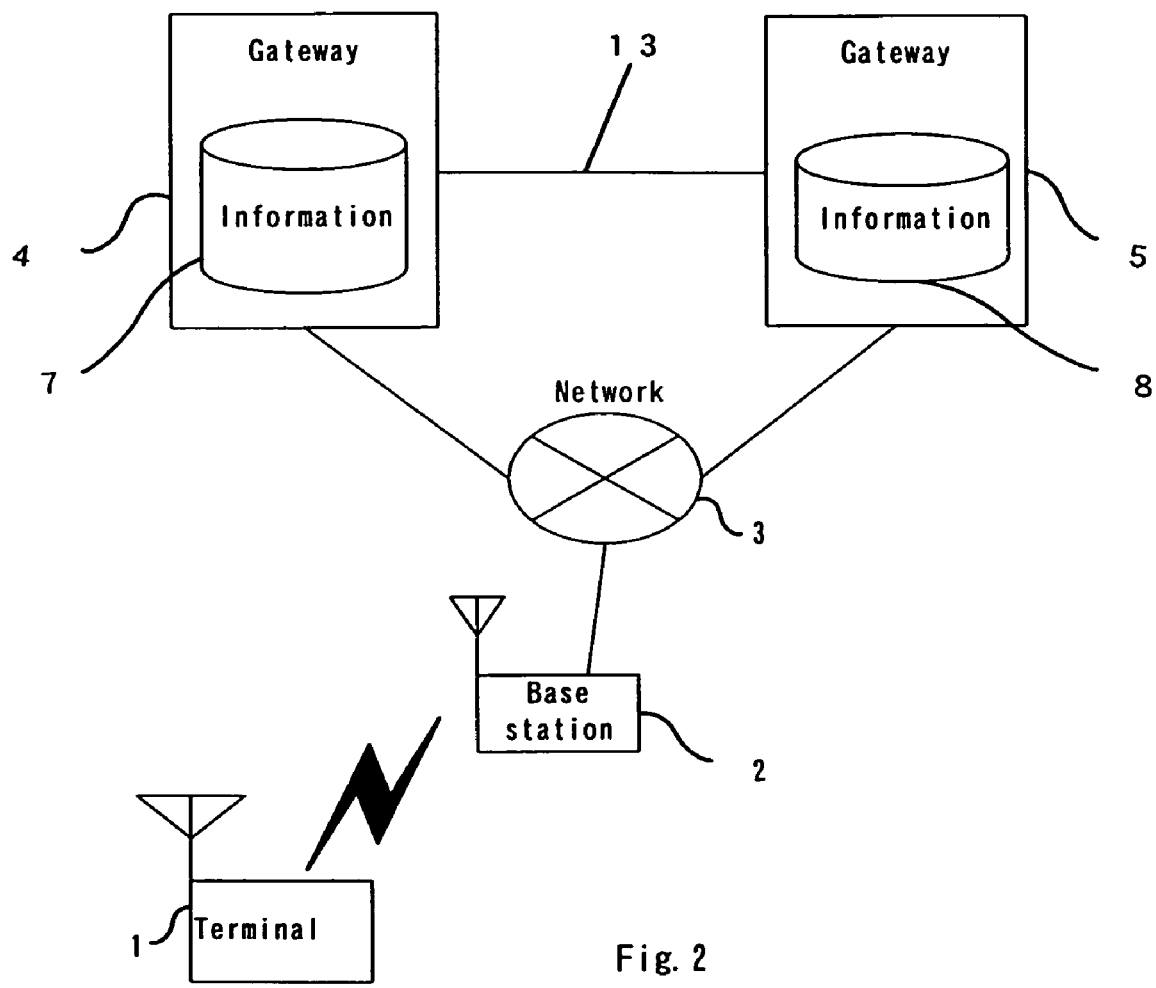
FIG. 2 is a structural view of a radio communication network via public network or in-house network with gateways themselves having information in the embodiment of this invention

FIG. 2 shows a constitution of the radio communication network via public network or in-house network in this embodiment of the present invention, wherein each gateway itself has an function of a server with information to execute a terminal application.

A terminal 1 is a radio intelligent terminal such as Personal Digital Assistant (PDA) including a personal phone.

A base station 2 is a base station for personal phone, and a network 3 is a public network for personal phone.

A gateway 4 and 5 are connected with the network 3, and are provided with a connecting means 13 as an information exchange means to perform the negotiation between gateways in this invention. The connecting means 13 to perform the negotiation between gateways may be connected in whichever cable or radio, otherwise the connecting method passing through the network 3 can be available.

The terminal 1 is connected with the gateway 4 or 5 via the base station 2 and the network 3, and executes an application using information 7 in the gateway 4 or information 8 in the gateway 5.

Figure 4:
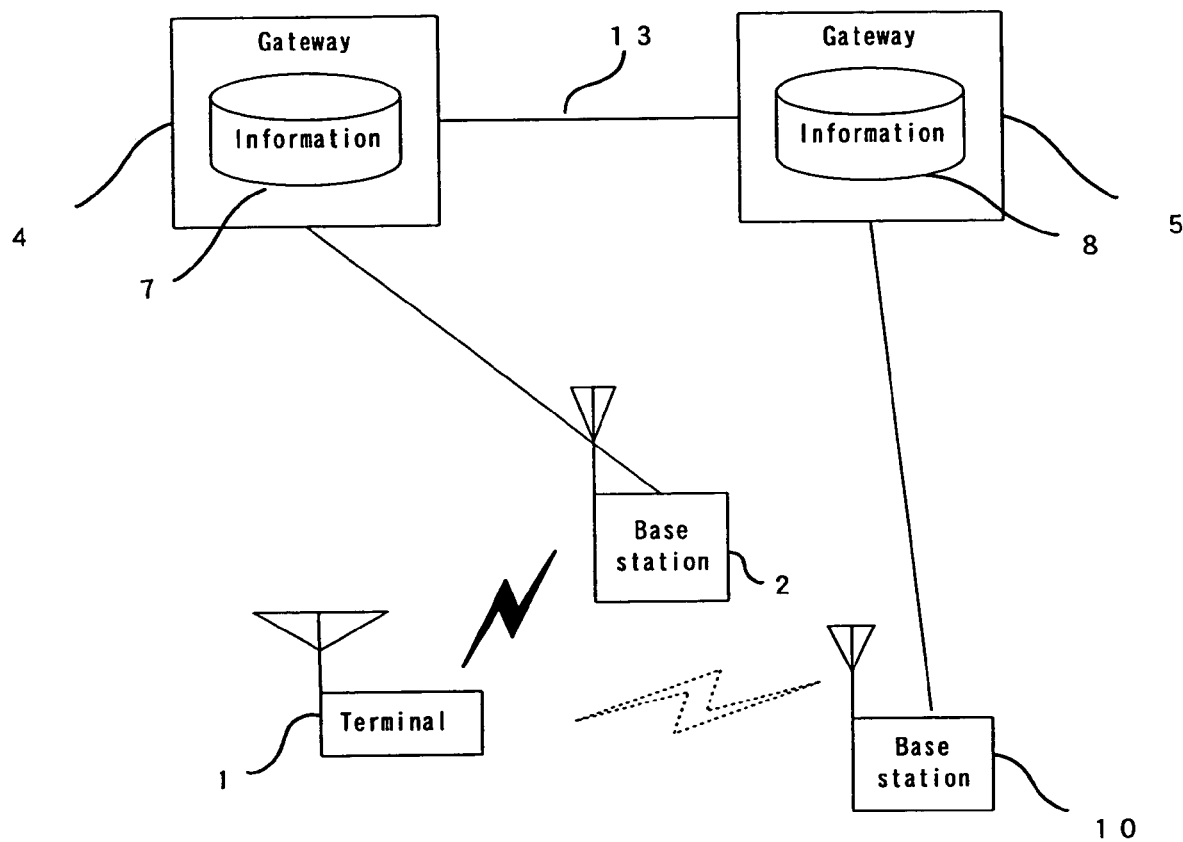
FIG. 4 is a constitutional view of a radio communication network with gateways themselves having information without passing through the public network or in-house network in the embodiment of this invention

And the constitution without passing through a public network and in-house network can be suggested as shown in FIG. 4.

Namely, in the structure in FIG. 4, the terminal 1 is connected with the gateway 4 via the base station 2, otherwise connected with the gateway 5 via the base station 10, by which the application is executed by using information 7 in the gateway 4 or information 8 in the gateway 5.

In both FIG. 2 and FIG. 4, the information 8 in the gateway 5 contains the information 7 in the gateway 4 or is the information with at least the same meaning as the information 7.

Figure 10:
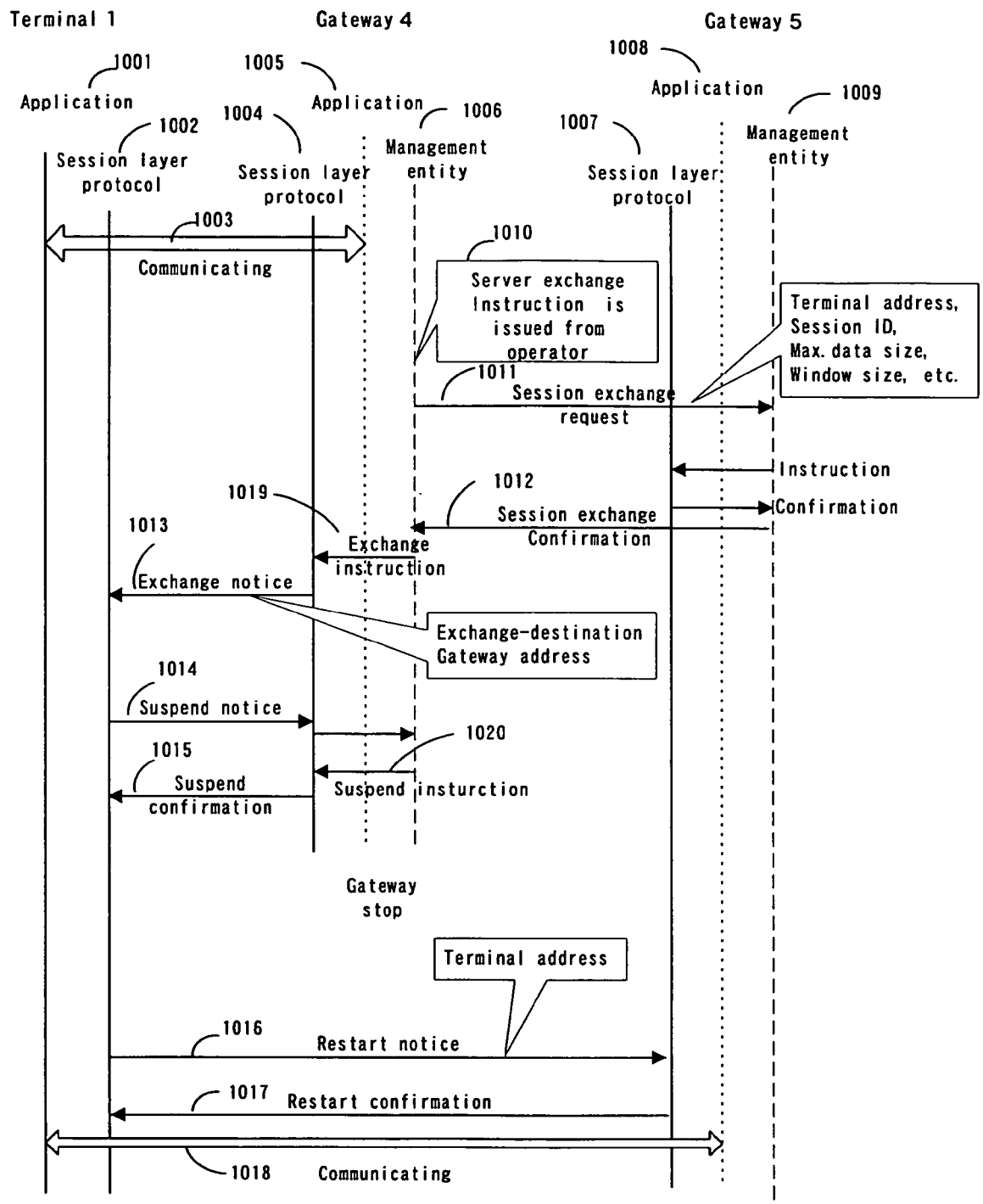
FIG. 10 shows a sequence of the gateway exchange in the embodiment of this invention under the constitution shown in FIG. 2.

FIG. 10 shows a sequence in case that the terminal 1 stops the gateway 4 which is in connection with with the terminal 1 and performs the connect exchange to the gateway 5.

The gateway exchange sequence in the embodiment 2 will be explained hereinafter according to FIGS. 2 and 10.

An application 1001 in the terminal 1 performs the communication 1003 with an application 1005 as a server in the gateway via a session layer protocol 1002 in the terminal 1 and a session layer protocol 1004 in the gateway 4.

When the terminal 1 is in communication with the gateway 4 as above, if a server exchange instruction 1010 of an operator is issued, a management entity 1006 in the gateway 4 performs the negotiation with a management entity 1009 in the gateway 5 in order to change the communication of the terminal 1 from the gateway 4 to gateway 5.

Namely, the management entity 1006 in the gateway 4 sends the session exchange request 1011 to the management entity 1009 in the gateway 5. At this time, the selection of an exchange-destination gateway receiving the session exchange request 1011 from the gateway 4 can be performed according to the information of the other gateway stored in the gateway 4 in advance, or according to the operator's instruction.

Here, the information 8 in the gateway 5 contains the information 7 in the gateway 4 used for executing the application 1001 by the terminal or has at least the same meaning as the information 7.

As the steps after the session exchange request 1011, that is, the steps of "the session exchange request 1011→the session exchange confirmation 1012→the session exchange instruction 1019→the exchange notice 1013" are the same as the steps of "the session exchange request 913→the session exchange confirmation 914→the session exchange instruction 922→the exchange notice 913", the detailed explanation will be omitted here.

The session layer protocol 1004 in the gateway 4 receives the exchange notice 1013, and sends the exchange-destination address to the session layer protocol 1002 in the terminal 1. Thereby, the terminal 1 can obtain the address information of the gateway 5 that is the exchange-destination gateway.

And, the steps after receiving the exchange notice 1013, that is, "the exchange notice 1013→the suspend notice 1014→the suspend instruction 1020→the suspend confirmation 1015→the restart notice 1016→the restart confirmation 1017", are the same as the steps in FIG. 9, that is, "the exchange notice 915→the suspend notice 916→the suspend instruction 923→the suspend confirmation 917→the restart notice 918→the restart confirmation 919", therefore the explanation will be omitted here.

According to the restart confirmation 1017 from the session layer protocol 1007 in the gateway 5, the session of the terminal which has been suspended stars at once. After starting the session, the session layer protocol 1002 in the terminal 1 performs the communication 1018 with the application 1008 in the gateway in order to execute the application 1001.

In the same way as in FIG. 9, after the terminal 1 sends out the the suspend notice 1014 to the session layer protocol 1004 in the gateway 4, it is possible to continue the sequence of the server connect exchange regardless of the state of the gateway 4. Therefore, the steps of the suspend instruction 1020 and the suspend confirmation 1015 can be deleted and the session layer protocol 1004 may independently send the suspend confirmation 1015 to th session layer protocol 1002 in the terminal 1 without receiving the suspend instruction 1020.

And in the same way as in FIG. 9, there is a case that some type of gateways send out only the suspend instruction 1020 but do not send out the suspend confirmation 1015. In both case, if the suspend confirmation 1015 is not sent out, the session of the terminal 1 is suspended after the suspend notice 1014 is sent out. And it may be arranged as follows. The session layer protocol 1002 in the terminal 1, at receiving the exchange notice 1013, instructs the application 1001 to perform the gateway exchange display. According to the function of the application 1001 or the instruction of the user, the session layer protocol 1002 in the terminal 1 may send the suspend notice 1014 to the session layer protocol 1004 in the gateway 4.

According to the sequence described above, it is possible to perform the gateway connect exchange of the terminal 1 in a short time, and also perform the gateway connect exchange of the terminal 1 without much influences on the application 1001 in the terminal 1 and the user.

Embodiment 3

Figure 3:
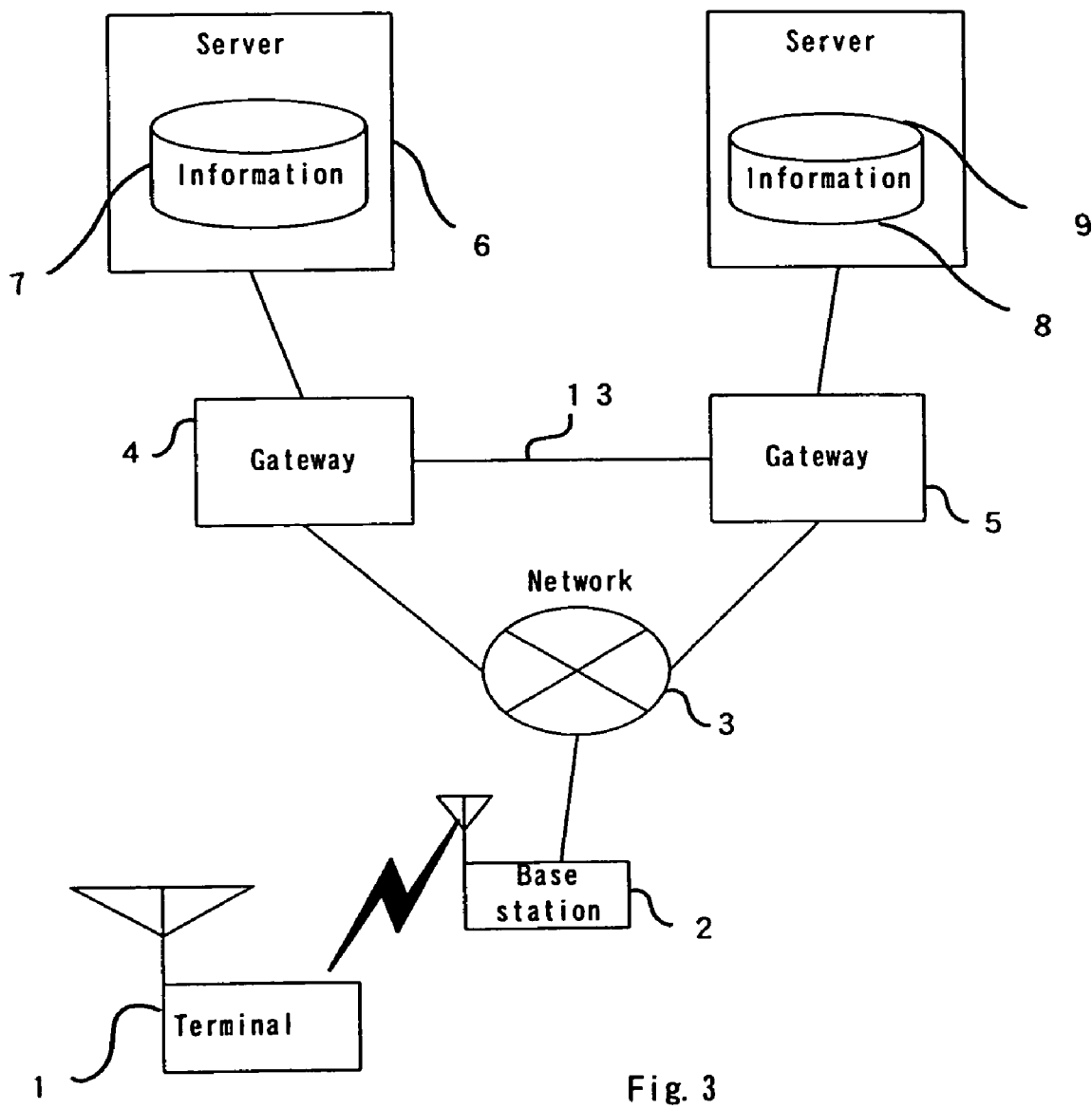
FIG. 3 is a constitutional view of a radio communication network via public network or in-house network with each gateway connected with its own server in the embodiment of this invention

FIG. 3 shows the constitution of a radio communication network with each gateway connected with its own server via public network or in-house network in this embodiment of the present invention.

A terminal 1 is a terminal of portable phone having a data processing function such as smart phone. A base station 2 is a base station for portable phone. And a network 3 is a in-house network, for example. A gateway 4 is connected with the network 3 and the server 6 respectively, and a gateway 5 is connected with the network 3 and the server 9 respectively.

And the gateway 4 and 5 have a connecting means to perform the negotiation between the gateways by using the information exchange means in the present invention. The connecting means may be whichever in cable or in radio, and the connecting means by way of the network 3 can be available.

The terminal 1 is connected with the server 6 by way of the base station 2, the network 3 and the gateway 4, and executes the application according to the information 7 in the server 6. Otherwise, the terminal 1 is connected with the server 9 by way of the base station 2, the network 3 and the gateway 5, and executes the application according to the information 8 in the server 9.

The information 8 in the server 9 contains the information 7 in the server 6, otherwise has at least the same meaning as the information 7.

Figure 11:
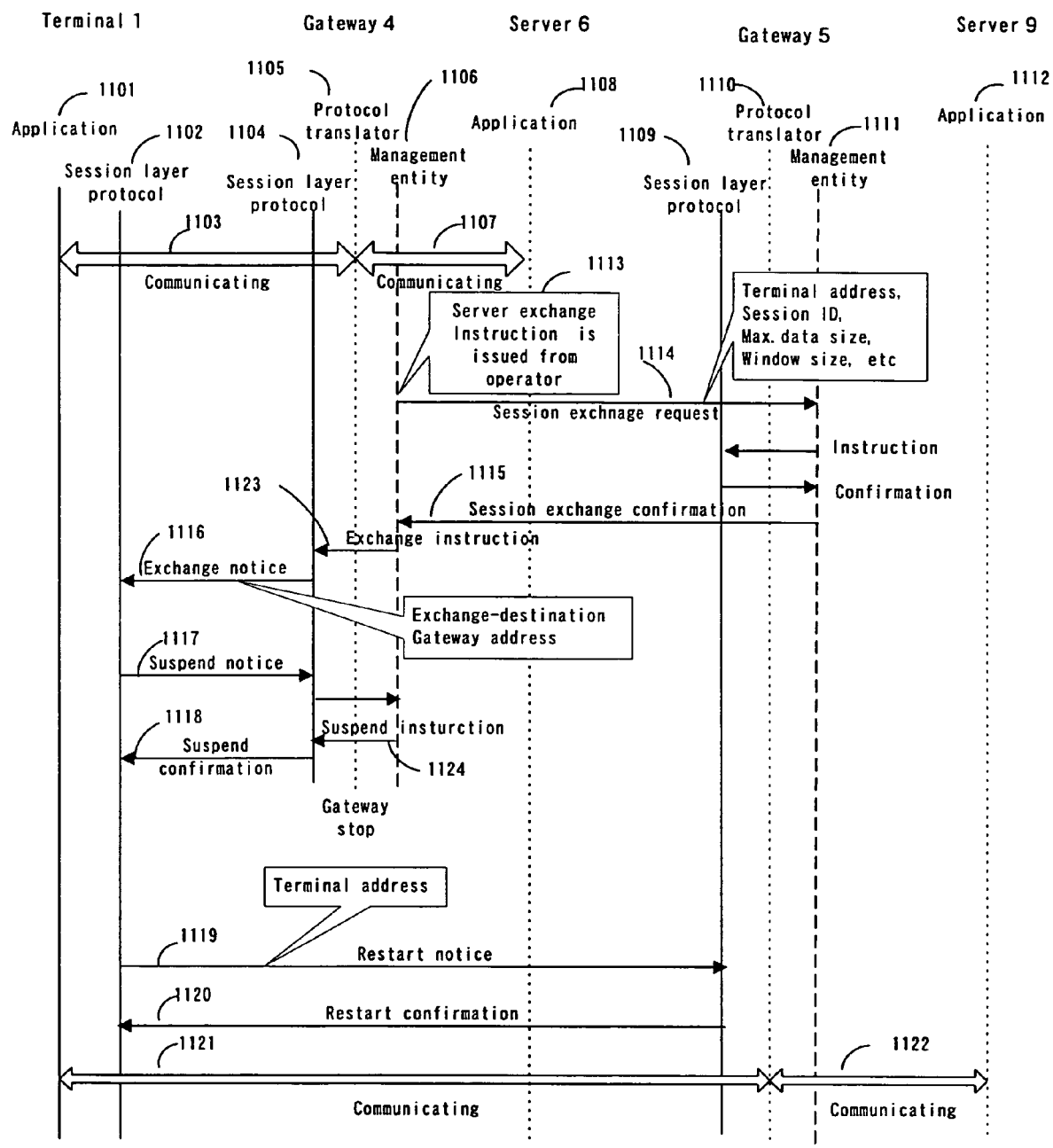
FIG. 11 shows a sequence of the gateway exchange in the embodiment of this invention under the constitution shown in FIG. 3.

When the gateway 4 stops while the terminal 1 is in connection with the server 6 via the gateway 4, the terminal 1 performs the connect exchange to the gateway 5 and the server 6, which sequence is shown in FIG. 11.

The gateway exchange sequence in the embodiment 3 will be explained hereinafter according to FIGS. 3 and 11.

A session layer protocol 1102 in the terminal 1 performs the communication with the application 1108 in the server 6 via the gateway 4 in order to execute the application 1101.

In this case, as the communication protocol used in the communication 1103 between the session layer protocol 1102 in the terminal 1 and the session layer protocol 1104 in the gateway 4 is different from the communication protocol used in the communication 1107 between the server 6 and the session layer protocol 1104 in the gateway 4, the protocol translation has to be performed by the protocol translator 1105 in the gateway 4.

The communication 1103 is translated by the protocol translator 1105 to the communication protocol used in the communication 1107 between the gateway 4 and the server 6, therefore it is possible to perform the communication between the terminal 1 and the server 6. But there is applications which do not require the protocol translation, in this case, it is not necessary to perform the protocol translation in the gateway.

Here, while the terminal 1 is in communication with the server 6, if the server exchange instruction 1113 of the operator is issued, the management entity 1106 (an information exchanging means) in the gateway 4 performs the negotiation with the management entity 1111 in the gateway 5 in order that the terminal 1 performs the connect exchange to the gateway 5 and the server 9.

The following sequence, that is, the steps of "the session exchange request 1114→the session exchange confirmation 1115→the exchange instruction 1123→the exchange notice 116" are the same as the steps in FIG. 9, that is, "the session exchange request 913→the session exchange confirmation 914→the exchange instruction 922→the exchange notice 915", which explanation in detail will be omitted here.

When the session layer protocol 1102 in the terminal 1 receives the exchange notice 1116, the suspend notice 1117 is sent to the session layer protocol 1104 in the gateway 4 at convenient timing for suspending the session such as when the application 1101 in executing now is not in the communication with the application 1108 in the server 6.

The following steps, that is, the steps of "the suspend notice 1117→the suspend instruction 1124→the suspend confirmation" and "the restart notice 1119→the restart confirmation 1120" are the same as the steps in FIG. 9 of "the exchange notice 915→the suspend notice 916→the suspend instruction 923→the suspend confirmation 917" and "the restart notice 918→the restart confirmation 919", therefore, the detailed explanation will be omitted here.

In the same way as in FIG. 9, the terminal 1 can continue the sequence for the server connect exchange regardless of the state of the gateway 4 after sending the suspend notice 1117 to the session layer protocol 1104 in the gateway 4. Therefore, the steps of the suspend instruction 1124 and the suspend confirmation 1118 are not always requested. And if there is not the suspend confirmation 1118, the session of the terminal 1 is suspended after sending out the suspend notice 1117.

And also in the same way in FIG. 9, at receiving the exchange notice 116, the session layer protocol 1102 in the terminal 11 may instruct the application 1101 to perform the gateway exchange display, otherwise the session layer protocol 1102 in the terminal 1 may send the suspend notice 1117 to the session layer protocol 1104 in the gateway 4 according to the function of the application 1101 or user's instruction.

According to the restart confirmation 1120 from the session layer protocol 1109 in the gateway 5, the session of the terminal 1 which has been suspended restarts. After the session starts, the session layer protocol 1102 in the terminal 1 is to perform the communication 1121 and 1122 with the application 1112 in the server 9 via the gateway 5 in order to execute the application 1101.

By using the sequence described above, the gateway connect exchange of the terminal 1 can be performed in a short time and without much influence on the application 1101 and the user.

Embodiment 4

Here is explained concrete examples of the applications for the gateway exchange sequence based on the constitution of FIG. 1 referring to FIGS. 12 to 17.

Figure 12:
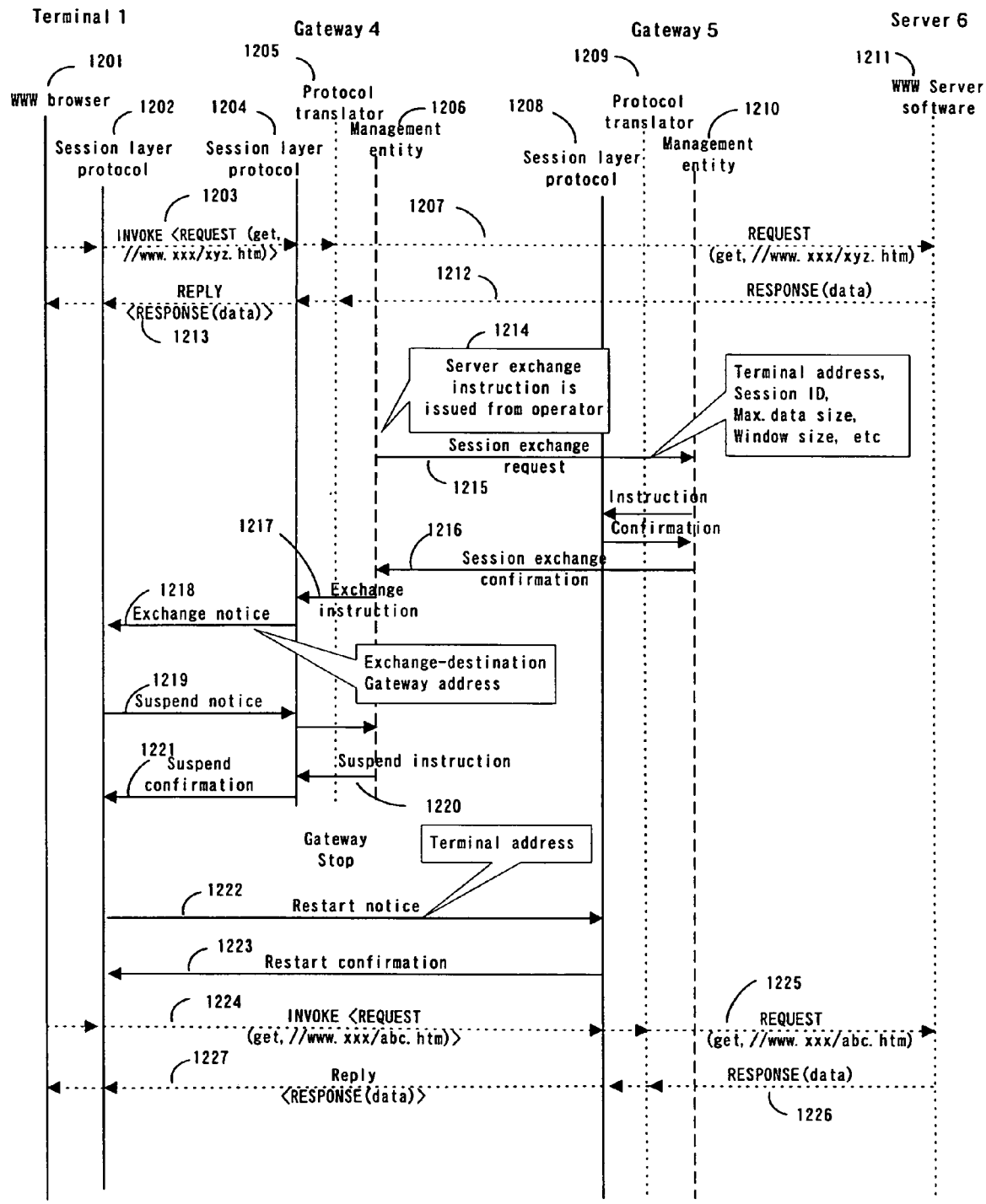
FIG. 12 shows a concrete example of the gateway exchange sequence in this invention.

When the gateway 4 stops while the terminal 1 of which a WWW browser is used by an user is in connection with a WWW server software in the server 6 via the gateway 4, the connection of the terminal is changed from the gateway 4 to the gateway 5, of which sequence is shown in FIG. 12.

The session layer protocol 1202 sends the command inputted from the WWW browser 1201 in the terminal by the user to the WWW server software 1211 in the server 6 via the gateway 4.

In this case, the communication protocol between the session layer protocol 1202 in the terminal 1 and the session layer protocol 1204 in the gateway 4 is a radio communication protocol, on the other hand, the communication protocol between the session layer protocol 1204 in the gateway 4 and the server 6 is a Hyper Text Transfer protocol (HTTP). Therefore, in order to meet those two protocols each other, the protocol translation is performed by the protocol translator 1205 in the gateway 4.

Here, for example, when the user operates WWW browser 1201 in ther terminal 1 and input and the access to a file //www, xxx/xyz, htm stored in the server 6 is performed, INVOKE<REQUEST ((get, //www,xxx/xyz,htm))>1203 that is a radio communication protocol command is translated to REQUEST (get, //www,xxx/xyz,htm) 1207 that is a HTTP command by the protocol translator 1205 and sent to the server 6.

The WWW server software 1211 in the server 6 receives the REQUEST (get, //www,xxx/xyz,htm) 1207 and sends out a file data of //www,xxx/xyz,htm by RESPONSE (data) 1212.

The RESPONSE (data) 1212 of HTTP response is translated by the protocol translator 1205 to REPLAY<RESEPONSE (data)>1213 that is a response of the radio communication protocol and is sent from the session layer protocol 1204 in the gateway to the terminal 1. Therefore, the communication between the terminal 1 and the server 6 can be performed. And the user can look through the file data of //www,xxx/xyz, htm in the sever 6 by the WWW browser 1201.

when the sever exchange instruction 1214 of the operator is issued while the terminal 1 is in communication with the server 6 as above, the management entity 1206 in the gateway 4 performs the negotiation with the management entity 1210 in the gateway 5 in order that the terminal 1 in communication performs the connect exchange to the gateway 5.

In other words, the management entity 1206 in the gateway 4 sends the session exchange request 1215 to the management entity 1210 in the gateway 5. The following steps, that is, the steps of "the session exchange confirmation 216→the exchange instruction 1217→the exchange notice 1218" and "the suspend notice 1219→the suspend instruction 1220→the suspend confirmation 1221" are the same as the steps in FIG. 9 of "the session exchange confirmation 914→the exchange instruction 922→the exchange notice 915" and "the suspend notice 916 the suspend instruction 923→the suspend confirmation 917", and the detailed explanation will be omitted here.

In the same way as in FIG. 9, after sending out the suspend notice 1219 to the session layer protocol 1204 in the gateway 4, the terminal 1 can continue the server connect exchange sequence regardless of the state of the gateway 5. Therefore, the steps of the suspend instruction 1220 and the suspend confirmation 1221 is not always required. And even if there is not the the suspend instruction 1220, the session layer protocol 1204 may send independently the suspend confirmation 1221 to the session layer protocol 1202 in the terminal 1.

And there are some type of gateway 4 that send out only the suspend instruction 1220 without the suspend confirmation 1221. In both case, if there is not the suspend confirmation 1221, the session of the terminal 1 is suspended after sending out the suspend notice 1219.

At this time, if the WWW browser 1201 has already received the file data of //www,xxx/xyz,htm, the user can continue to look through the data in stead of the suspending of the session. It is needless to say that it is not necessary to suspend the execution of the WWW browser 1201 of the application in the terminal 1.

At receiving the exchange notice 1218, the session layer protocol 1202 in the terminal 1 instructs the WWW browser 1201 to perform the gateway exchange display, and according to the function of the WWW browser 1201 or the user's instruction, the session layer protocol 1202 in the terminal 1 may send the suspend notice 1219 to the session layer protocol 1204 in the gateway 4.

The steps of sending out the restart notice 1222 from the terminal 1 and the restart confirmation 1223 from the gateway 5 is the same as of the restart notice 918 and the restart confirmation 919 shown in FIG. 9, which explanation will be omitted here.

According to the sequences described above, the session of the terminal 1 which has been suspended is to restart.

Under these conditions, when the user operates WWW browser 1201 in the terminal and instruct to access to a file of //www, xxx/xyz, htm, INVOKE<REQUEST ((get, //www,xxx/xyz,htm))>1224 that is a radio communication protocol command is translated to REQUEST ((get, //www, xxx/xyz,htm)) 1225 that is a HTTP command by the protocol translator 1209 in the gateway 5 and then sent to the server 6.

The WWW server software 1211 in the server 6 receives the REQUEST (get, //www,xxx/xyz,htm) 1225 and sends out a file data of //www,xxx/xyz,htm by RESPONSE (data) 1226.

The RESPONSE (data) 1226 that is a HTTP response is translated by the protocol translator 1209 in the gateway 5 to REPLAY<RESEPONSE (data)>1227 that is a response of the radio communication protocol and is sent from the session layer protocol 1208 in the gateway 5 to the terminal 1.

According to these steps, it is possible to perform the communication between the terminal 1 and the server 6 via the gateway 5. And the user can look through the file data of //www,xxx/xyz,htm in the sever 6 by the WWW browser 1201.

<The Generation of New Communication During the Negotiation>

Figure 13:
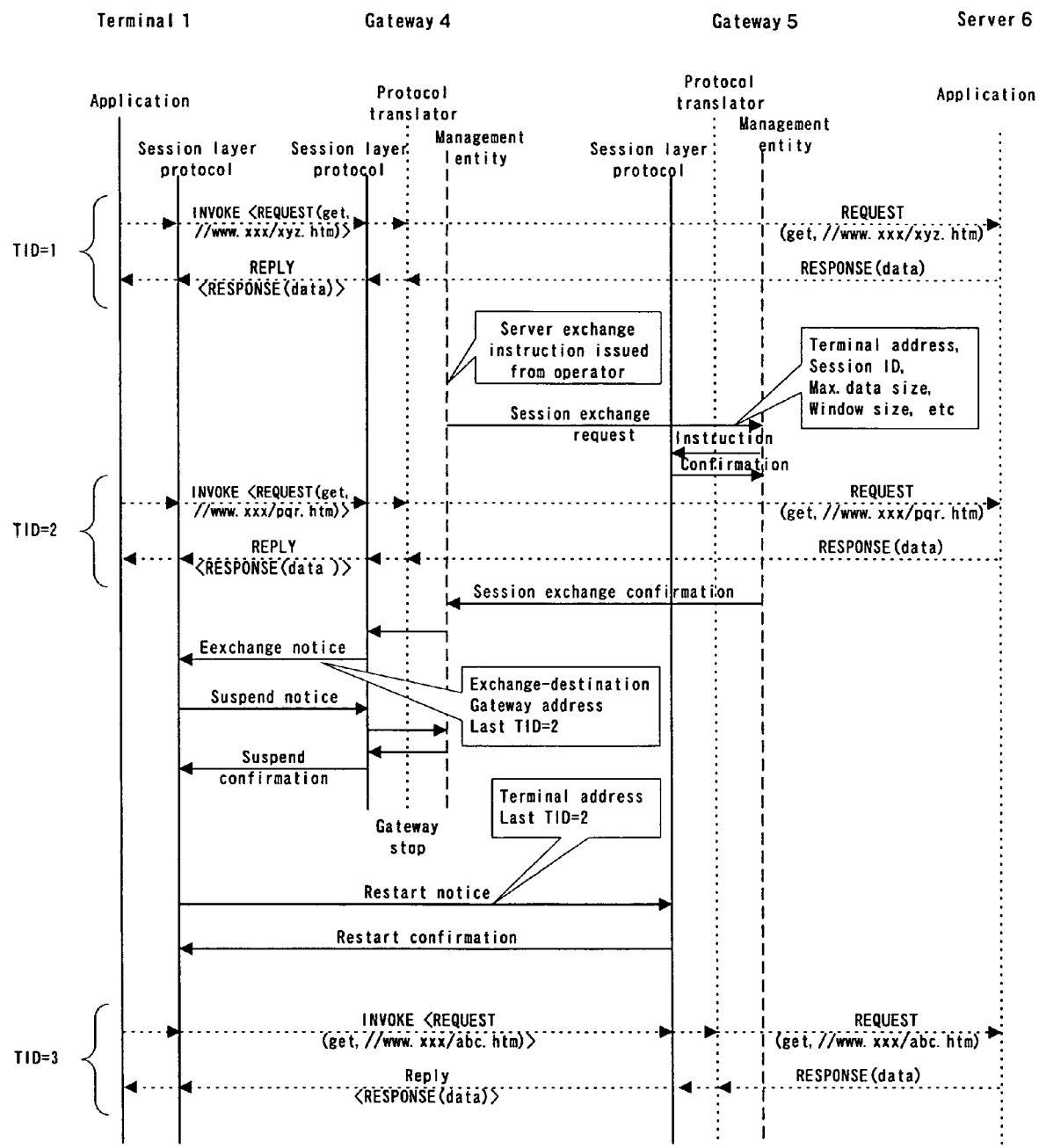
FIG. 13 shows a sequence in case that the communication generates between the terminal and the server for the period of the negotiation between gateways.

Referring to FIG. 13 here is explained a sequence in case that a new communication between the terminal and the server generates during the negotiation.

The session connect exchange request from the gateway 4 to the gateway 5 and the steps from the instructions to the confirmations between the session layer protocol and the management entity in the gateway 5 therewith are the same as in FIG. 12.

After that, the communication between the terminal 1 and the server 6 generates before the session exchange confirmation is sent from the gateway 5 to the gateway 4, which conditions are shown in FIG. 13.

Therefore, it happens that there is a difference between the communicating conditions between the terminal 1 and the gateway 4 that is notified by the session exchange request from the gateway 4 to the gateway 5, and the communicating condition between the terminal 1 and the gateway 4 after the terminal 1 performs the communication with the server 6 before sending out the session exchange confirmation. In a result, these communication conditions cannot meet each other.

The information indicating the communicating conditions between the terminal 1 and the gateway 5 is TID shown at the left end of FIG. 13. Here, the TID sent together with the session exchange request from the gateway 4 to the gateway 5 is TID=1 shown at the top position. The TID after the terminal 1 performs the communication with the server 6 is TID=2 shown at the center position. Therefore, the TID=1 sent to the gateway 5 is different from the TID=2 in the present status, there is a possibility that the error occurs in the communication processing between the terminal 1 and the gateway 5 after the gateway connect exchange.

Even if the communication between the terminal 1 and the server 6 generates during the negotiation between the gateways, in order to keep the match of TID, the latest TID (TID=2 in FIG. 13) is sent at the same time that the restart notice is sent from the terminal 1 to the gateway 5.

<The Exchange Processing for a Plural Terminal>

Figure 14:
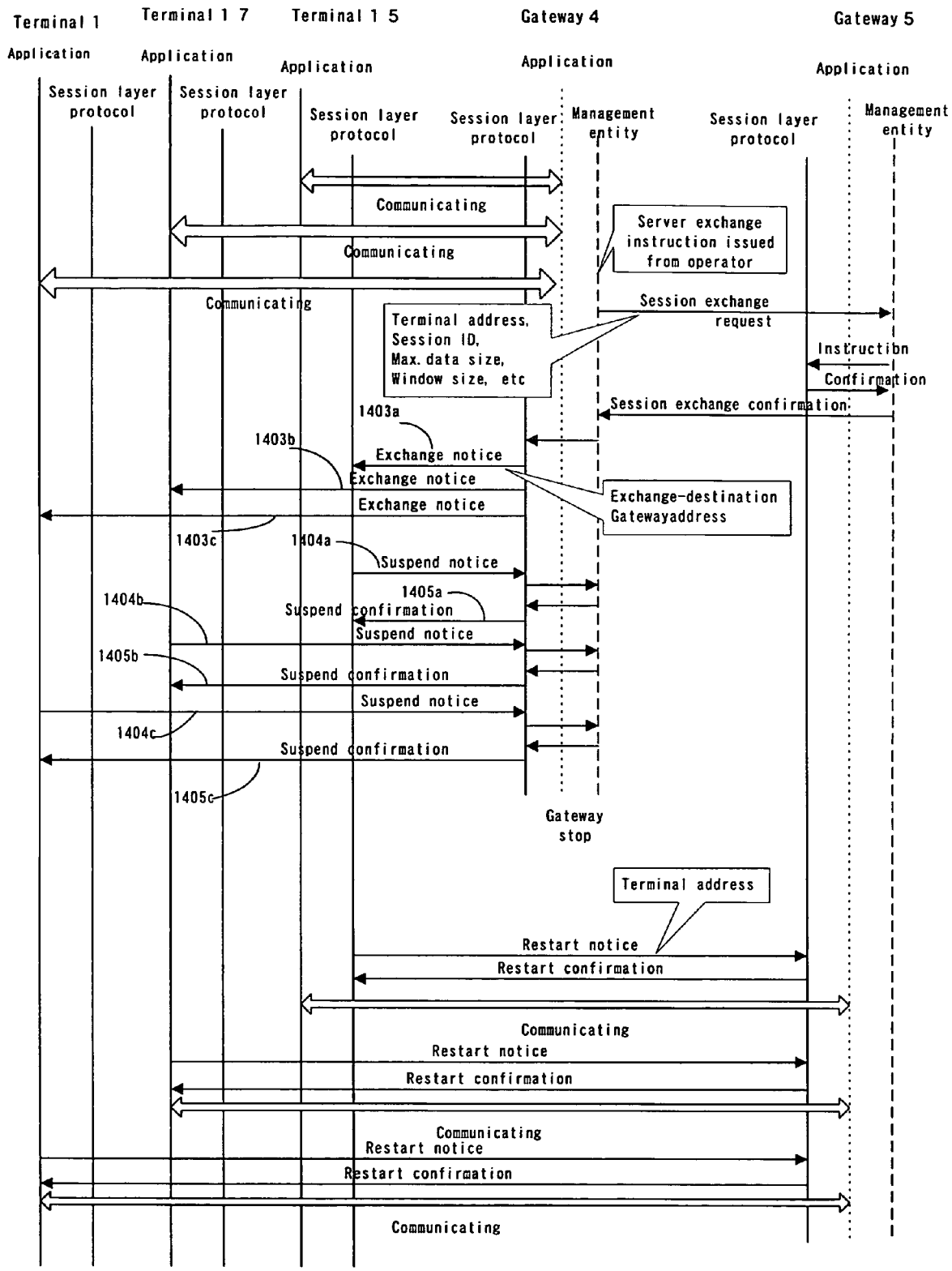
FIG. 14 shows a sequence showing the timing for stopping the gateway in communication with a plural terminal.

The stop timing of the gateway in connection with a plural terminal is explained according to FIG. 14.

The gateway 4 is in connection with a terminal 1, 15 and 17 respectively. Under these conditions, the session exchange negotiation between the gateway 4 and 5 is performed in the same as in FIG. 12.

Though the session exchange negotiation in FIG. 14 is performed with the terminal 1, 17 and 15 at one time, the negotiation may be performed with each terminal independently.

After executing the session exchange negotiation between the gateway 4 and 5 (the session exchange request 1401→the session exchange confirmation 1402), the gateway 4 sends the exchange notice to the terminal 1, 17 and 15 respectively. Each terminal 1, 17 and 15 sends the suspend notice 1403a, 1403b and 1403c to the gateway 4. After receiving the suspend instruction 1404a, 1404b and 1404c from each terminal in connection with the gateway 4, the gateway 4 sends out the suspend confirmation 1405a, 1405b and 1405c to each terminal and then is to stop.

On the other hand, the gateway 4 has a permissible time from the exchange notice to the terminal to the suspend notice to the gateway 4, and if the permissible time is out, it may be suggested a sequence that the gateway 4 stops even if there is a terminal without sending out the suspend notice to the gateway 4.

<The Case of the Rejection of Exchange-Destination Gateway>

Figure 15:
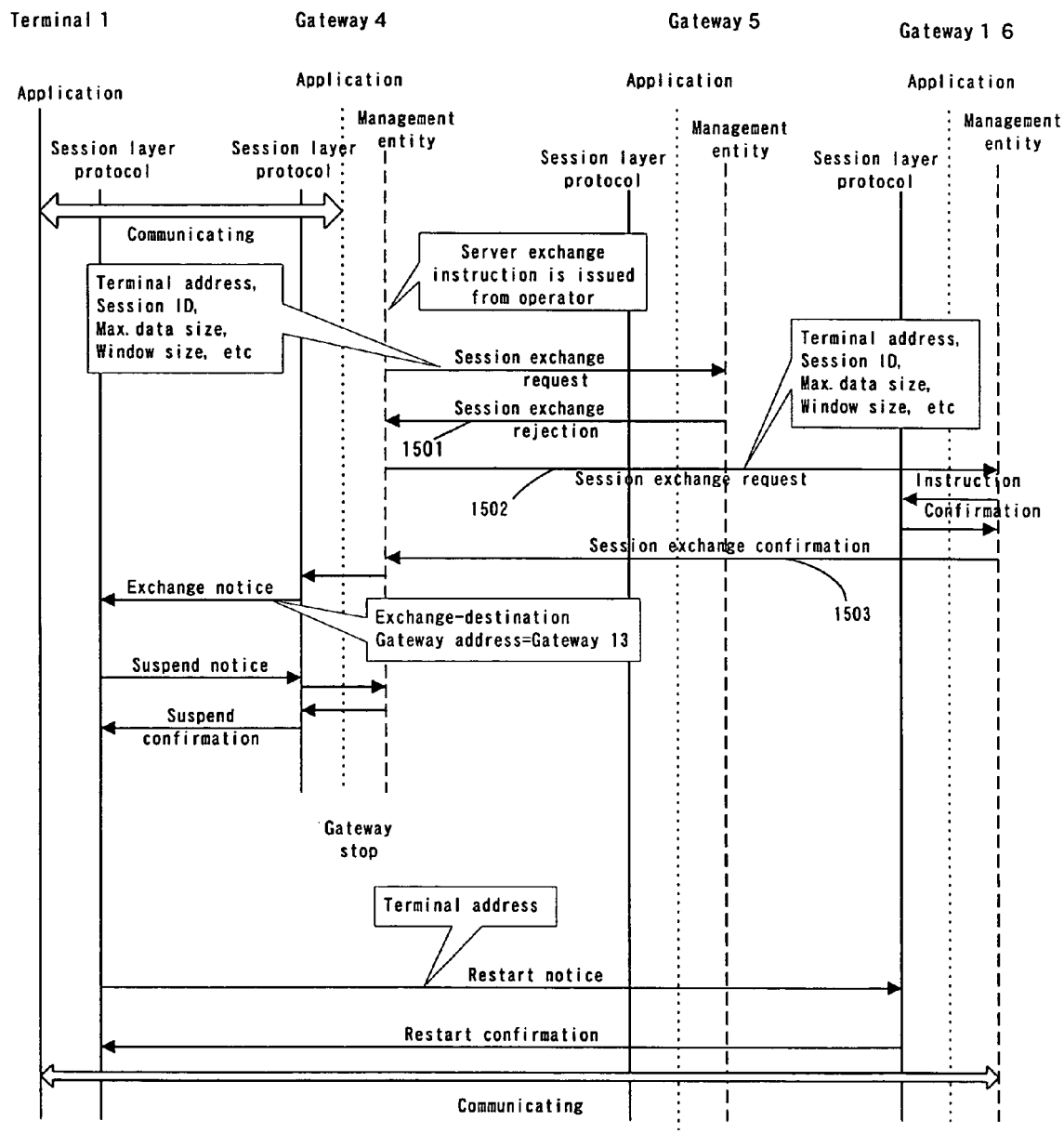
FIG. 15 shows a sequence in case of performing the connect exchange to other gateway because of receiving the exchange rejection from the exchange-destination gateway by the gateway negotiation

Referring to FIG. 15, here is explained a sequence in case that the connect exchange of the terminal is rejected by the exchange-destination gateway at the negotiation.

The sequence as far as the session exchange request is sent from the gateway 4 to the gateway 5 is the same as in FIG. 12. The gateway 5 sends out the session exchange rejection 1501 to the gateway 4 because of the shortage of capability and the excess of load. The gateway 4 received the session exchange rejection 1501 sends the session exchange request 1502 to the gateway 16 as the new exchange-destination. If the gateway 16 has a capability for accommodating the terminal, the gateway 16 sends out the session exchange confirmation 1503 to the gateway 4 and then the connect exchange is performed.

As described above, even if the connect exchange is rejected by the exchange-destination gateway, the gateway 4 may perform the negotiation with other gateway for finding out the exchange-destination gateway. This function is to be included in the management entity in the exchange-original gateway. The constitution is arranged as follows. A plurality of exchange-destination gateway may be registered beforehand in priority order in the memory of the gateway 4. At receiving the rejection notice, the management entity may read out next nominated exchange-destination gateway from the memory, and the sequence for information exchange may be executed automatically.

<The Case of a Capability Shortage of Exchange-Destination Gateway>

Figure 16:
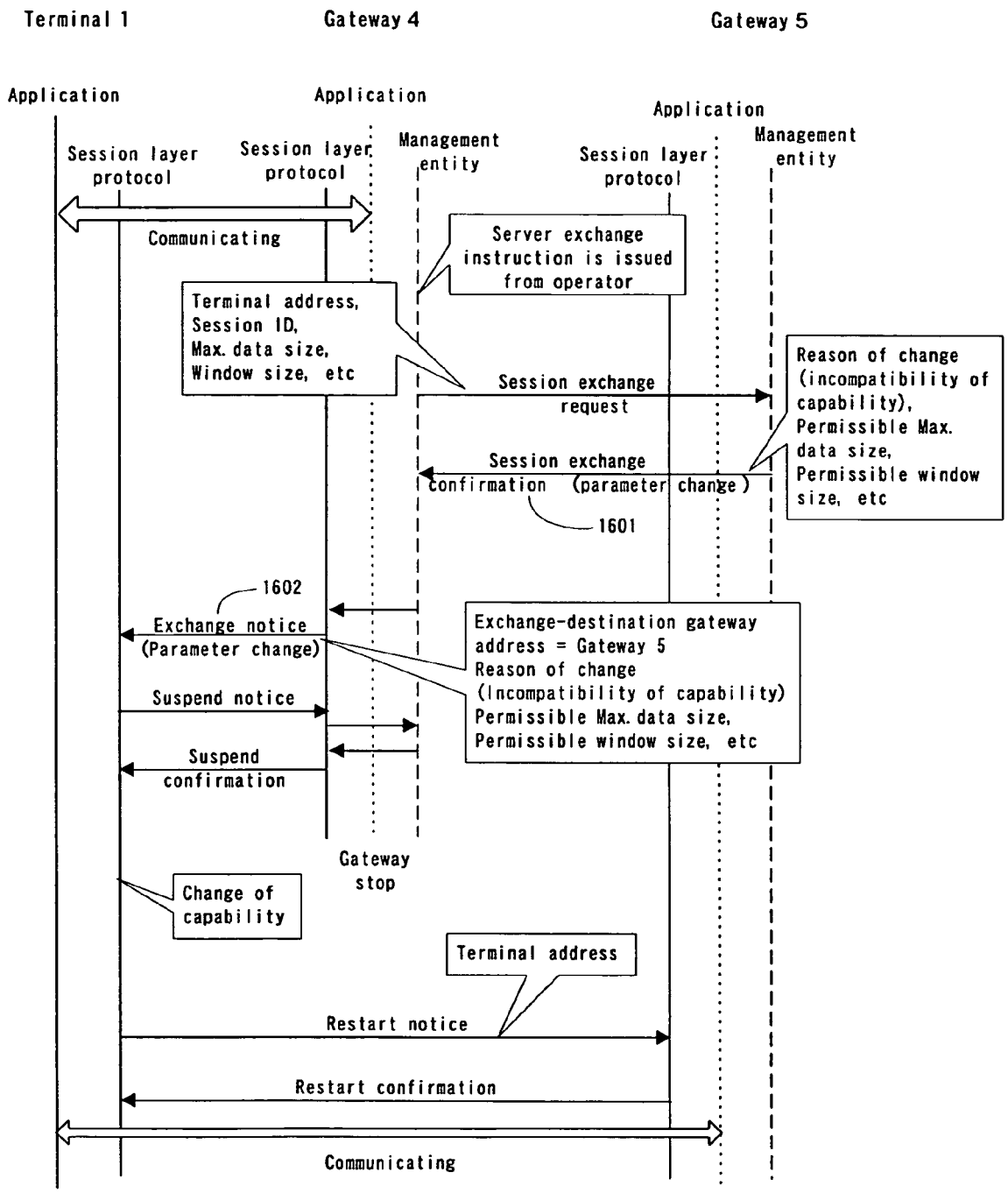
FIG. 16 shows a sequence in case of the exchange-destination gateway without the capability of accommodating the terminal.

The sequence in case that the exchange-destination gateway sends the information of the capability shortage for the terminal together with the session exchange confirmation at the negotiation will be explained referring to FIG. 16.

And the sequence as far as the gateway 4 sends the session exchange request to the gateway 5 is the same as in FIG. 12.

When the gateway 5 cannot offer all resources required by the terminal according to the information that the gateway 4 sends out together with the session exchange request, said information are a maximum data size, window size and etc., the gateway 5 sends to the gateway 4 the information of the maximum resource together with the session exchange confirmation 1601. That is, the gateway 4 receives the maximum resource that the gateway 5 can offer to the terminal required the connect exchange.

The gateway 4 sends the possible maximum resource to the terminal 1 together with the exchange notice 1602. According to this information, the terminal 1 changes its capability (the information of its own facility) to meet the maximum resource of the gateway 5.

According to this processing after the connect exchange to the gateway 5, the terminal 1 may perform the communication based on the changed capability. And the exchange-original gateway is provided with a judgement means judging whether it is possible to perform the communication between the exchange-destination gateway and the terminal 1, if impossible, the communication may be suspended.

And further, the terminal is provided with a judgment means judging whether it is possible to perform the communication based on the informed capability, if impossible, the receipt of services may stop.

<The Case Provided with the Retransmission Step>

Figure 19:
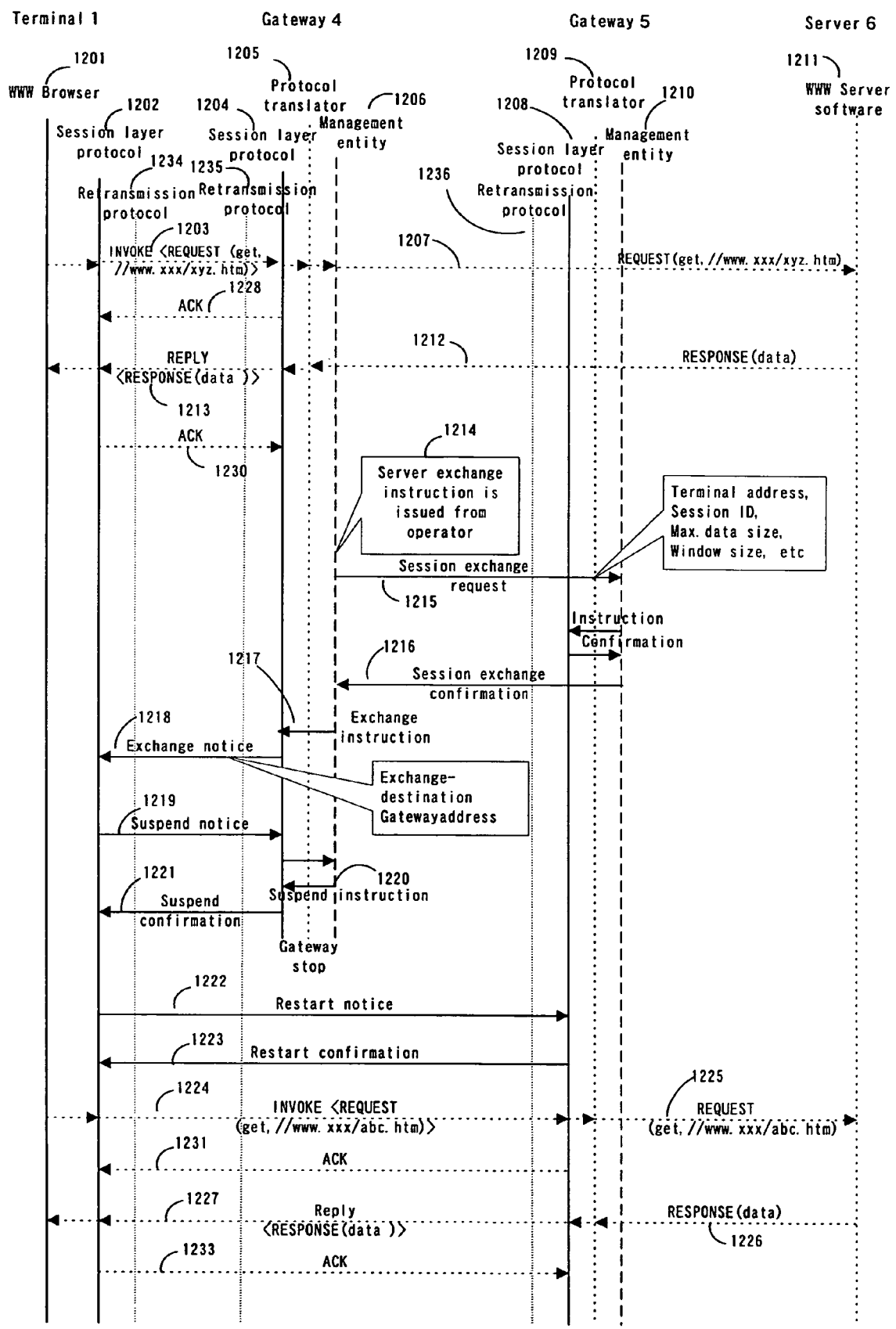
FIG. 19 is a concrete example showing a sequence of the gateway exchange in this invention.

FIG. 19 shows a sequence in case of the terminal 1, the gateway 4 and 5 including data retransmission protocol respectively. Though the retransmission protocol is put in lower position at session layer in FIG. 19, it is needless to say that the retransmission protocol is included in the session layer.

As explained in FIG. 12, after INVOKE<REQUEST (get, //www,xxx/xyz,htm)>1203 (a command of radio communication protocol) is translated to REQUEST (get, //www,xxx/xyz,htm) 1207 (a command of HTTP) by the protocol translator 1205 and sent to the server 6, the session layer protocol 1204 in the gateway sends ACK1228 (acknowledge of radio communication protocol) to the session layer protocol 1202 in the terminal 1. At receiving said ACK1228, the terminal 1 judges that the gateway 4 has received INVOKE<REQUEST (get, //www,xxx/xyz,htm)>1203.

When RESPONSE (data) 1212 (a response of HTTP) is translated to REPLAY<RESPONSE (data)>1213 (a response of radio communication protocol) by the protocol translator 1205 in the gateway 4 and then sent from the session layer protocol 1204 in the gateway to the terminal 1, the session layer protocol 1202 in the terminal 1 receiving REPLAY<RESPONSE (data)>1213 sends ACK1230 to the gateway 4. At receiving ACK1230, the gateway 4 judges that the terminal 1 has received the REPLAY<RESPONSE (data)>1212.

And, after the restart confirmation 1223, INVOKE<REQUEST (get, //www,xxx/xyz,htm)>1224 is translated to REQUEST (get, //www,xxx/xyz,htm) 1225 by the protocol translator 1209 in the gateway 5 and then sent to the server 6. At this time, the session layer protocol 1208 in the gateway 5 sends ACK1231 to the session layer protocol 1202 in the terminal 1. And at receiving REPLAY<RESPONSE (data)>1227, the session layer protocol 1202 in the terminal 1 sends ACK1233 to the gateway 5.

The retransmission protocol in the terminal 1, gateway 4 and 5 will be explained hereinafter referring to FIG. 20.

If the terminal 1 cannot receive ACK1314 from the gateway 4 within a regulated time after sending out INVOKE<REQUEST (get, //www,xxx/xyz,htm)>1309, the retransmission protocol 1303 in the terminal 1 performs the retransmission of INVOKE<REQUEST (get, //www,xxx/xyz,htm)>1310.

If ACK1314 returns from the gateway 4, the terminal 1 stops the retransmission. And the terminal 1 is provided with a timer for counting the regulated time, which has maximum regulated value for the frequency of retransmission. If the frequency of retransmission is over the maximum regulated value, the terminal 1 disconnects the communication by judging that any error occurs in the communication between the terminal 1 and the gateway 4.

In the same way, if the gateway 4 cannot receive ACK1319 from the terminal 1 within a regulated time after sending out REPLAY<RESPONSE (data)>1316, the retransmission protocol 1304 in the gateway 4 performs the retransmission of REPLAY<RESPONSE (data)>1317.

If ACK1319 returns from the terminal 1, the gateway 4 stops the retransmission. And the gateway 4 is provided with a timer for counting the regulated time, which has maximum regulated value for the frequency of retransmission. If the frequency of retransmission is over the maximum regulated value, the gateway 4 disconnect the communication by judging that any error occurs in the communication between the terminal 1 and the gateway 4.

<The Suspend Display>

Figure 17:
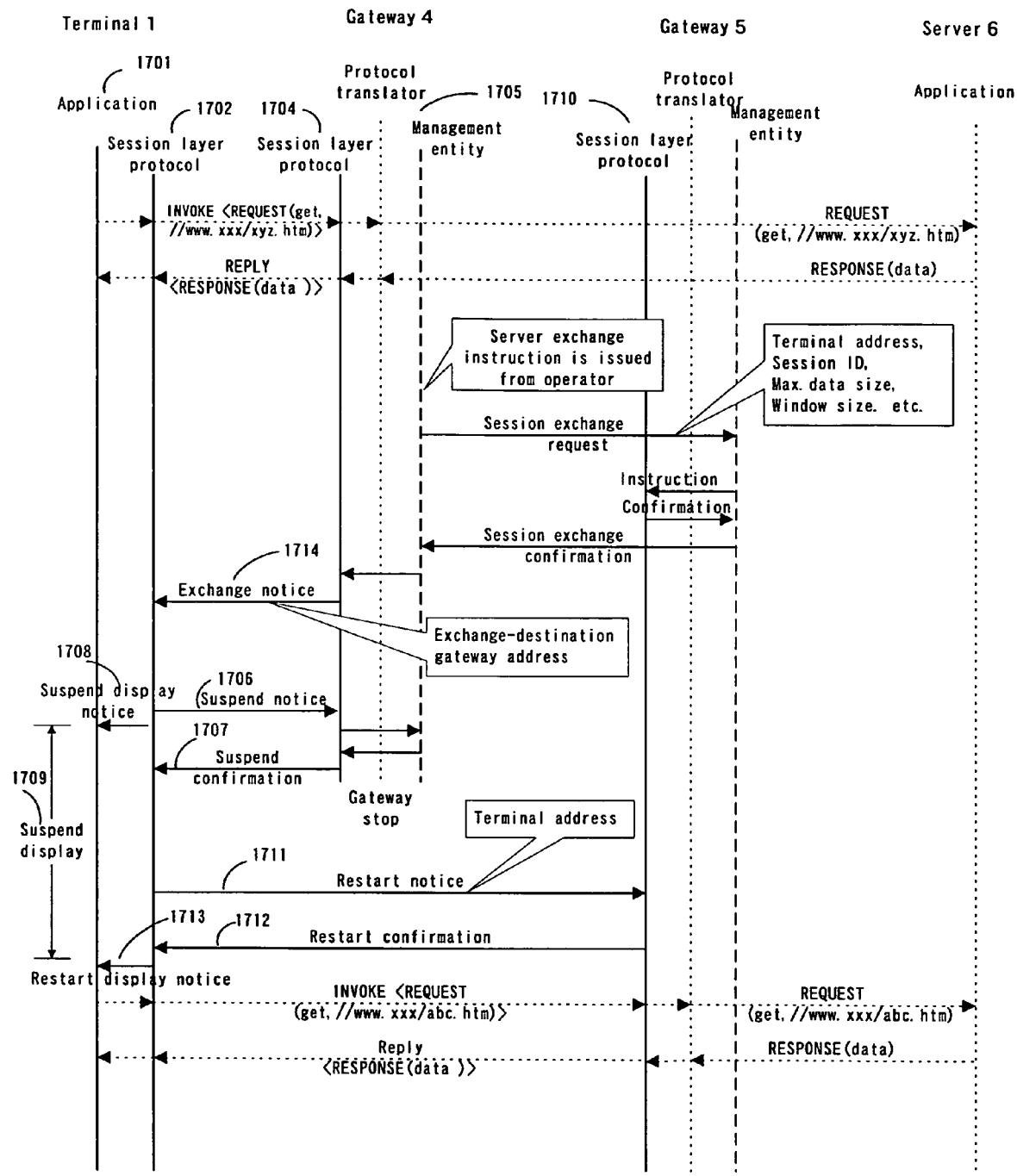
FIG. 17 shows a sequence in case of displaying by the application in the terminal that the gateway exchange is now running.

FIG. 17 shows a sequence in case of performing the suspend display for the user.

The sequence up to the exchange notice 1714 is the same as in FIG. 12, which explanation is omitted here.

The session layer protocol 1702 in the terminal 1 sends the suspend notice 1706 to the session layer protocol 1704 in the gateway 4, and at the same time the suspend-display notice 1708 is sent to the application 1701 in the terminal. When the application 1701 receives the suspend-display notice 1708, the suspend display 1709 is executed on the screen in the terminal 1.

As the suspend display 1709, the screen displays messages, such as "the gateway stops because of the version-up operation and the connection change to the gateway 5 is performed", which purpose is to make an user understand that there is no trouble in the gateway, terminal and network.

After that, the session layer protocol 1702 in the terminal 1 sends the restart notice 1711 to the session layer protocol 1710 in the gateway 5, and the session layer protocol 1710 in the gateway 5 sends back the restart confirmation 1712 to the session layer protocol 1702 in the terminal 1.

Otherwise, according to the user's instruction during a time of the suspend display 1709, the session layer protocol 1702 in the terminal 1 may send the restart notice 1711 to the session layer protocol 1710 in the gateway 5.

After receiving the restart notice 1712, the session layer protocol 1702 in the terminal 1 sends the restart-display notice 1713 to the application 1701. The application 1701 finishes the suspend display 1709 at receiving the restart-display notice 1713.

<The Generation of Radio Communication Protocol Command after the Exchange Notice>

Figure 21:
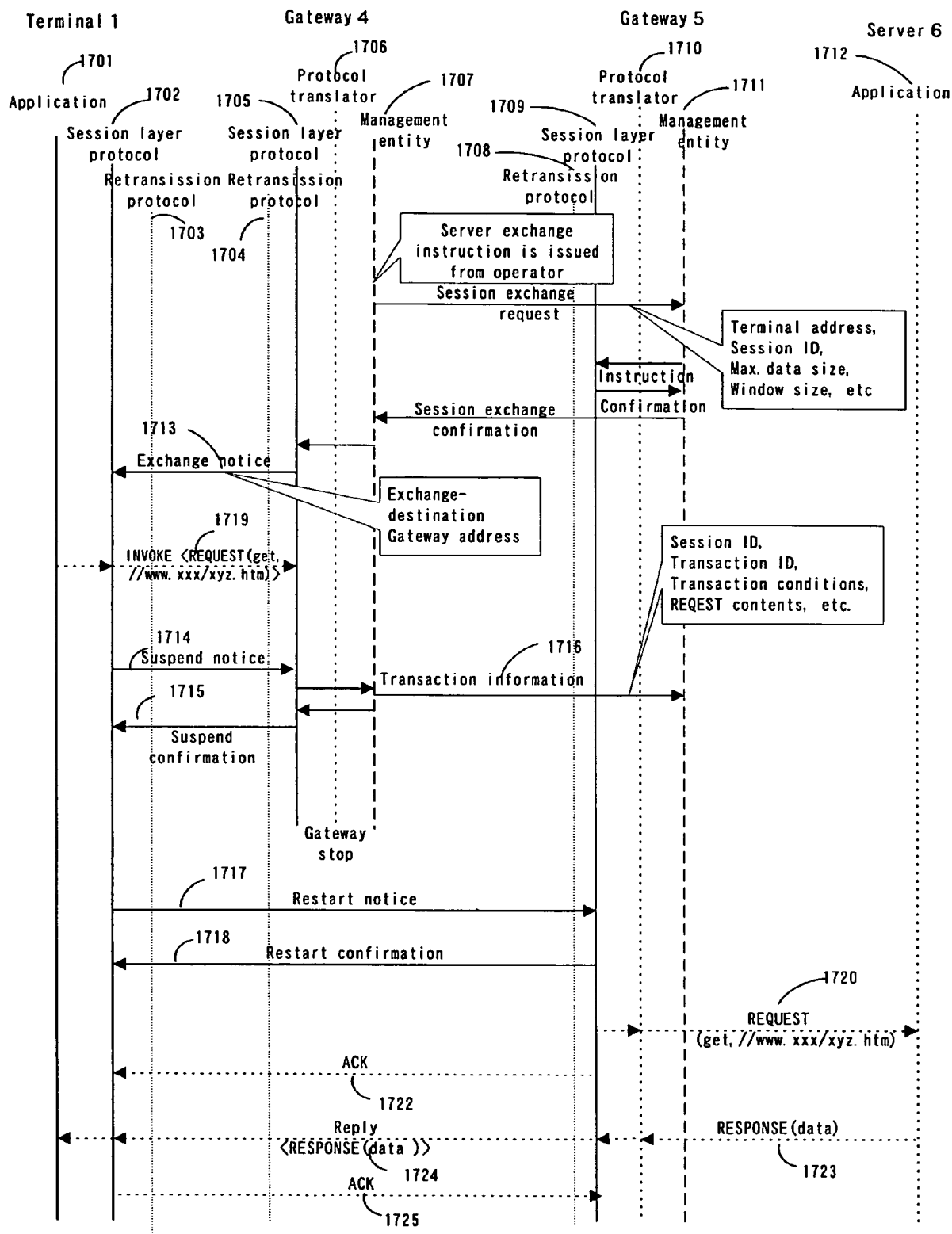
FIG. 21 shows a sequence of a transaction processing generated after the gateway exchange notice.

FIG. 21 shows the sequence in case of generation of command of radio communication protocol from the terminal 1 immediately after the exchange notice. A concept of transaction is introduced into this embodiment.

The logical connection between the terminal 1 and the gateway 4 is called "session", and the actual data communication by the application is called "transaction". The transaction indicates the sequential operation and processing from the user's request/notice to the corresponding server's response, or from the server's request/notice to the corresponding user's response. Here are a plural transaction in one session. In order to distinguish corresponding request/notice/response, each transaction unit has an identifier (an transaction identification.

The sequence up to the exchange notice 1713 is the same as in FIG. 19, which explanation is omitted here.

As the gateway 4 has already sent the gateway exchange notice 1713 to the session layer protocol 1702 in the terminal 1, it keeps the contents of INVOKE<REQUEST (get, //www,xxx/xyz,htm)>1719.

After receiving the exchange notice 1713, the session layer protocol 1702 in the terminal 1 sends the suspend notice 1714 to the session layer protocol 1705 in the gateway 5. The session layer protocol 1705 in the gateway 5 informs the management entity 1707 of the receipt of the suspend notice 1705, and the management entity 1707 sends to the management entity 1711 in the gateway 5 the transaction information 1716 (transaction conditions, transaction ID, and the contents of INVOKE<REQUEST (get, //www,xxx/xyz,htm)>).

The following steps, that is, the steps of "the suspend confirmation 1715→the restart confirmation 1717→the restart confirmation 1718" is the same as the steps of "the suspend confirmation 917→the restart notice 918→the restart confirmation 919" in FIG. 9, which explanation is omitted here. When the session between the session layer protocol 1702 in the terminal 1 and the session layer protocol 1709 in the gateway 5 starts, the session layer protocol 1709 in the gateway 5 refers to the transaction conditions and transaction ID received as the transaction information 1716 and translates the contents of REQUEST to REQUEST (get, //www,xxx/xyz,htm) 1720 by the protocol translator 1710, and then sends it to the server 6.

The sequence from the following step to ACK 1725 of radio communication protocol is the same as in FIG. 19, which explanation are not described here.

It may be arranged here that INVOKE<REQUEST (get, //www,xxx/xyz,htm)>1719 sent from the terminal 1 is translated to REQUEST (get, //www,xxx/xyz,htm) 1720 by the protocol translator 1720 in the gateway 4 and then sent to the management entity 1711 in the gateway 5 as the transaction information 1716.

And though the management entity 1707 in the gateway 4 performs the communication with the management entity 1711 in the gateway 5 after receiving the suspend notice 1714, the communication may be performed before receiving the suspend notice 1714.

And in case that ACK is not sent from the terminal 1 and the gateway 4 and 5, the sequence can be performed in the same way as the sequence without sending ACK 1722 and 1725. Namely, the sequence of ACK is not always required.

And in case of the terminal 1 and the gateway 4 and 5 including retransmission protocols, the same sequence can be performed.

<The Exchange Instruction Before the Generation of Server's Response>

Next, with reference to FIG. 22, a sequence in case that before the gateway 4, which has already received a command of radio communication protocol from the terminal 1 and has sent out a corresponding ACK of radio communication protocol to the terminal 1, receives HTTP response from the server, the sever exchange instruction generates from an operator of the gateway 4 will be explained here.

Figure 22:
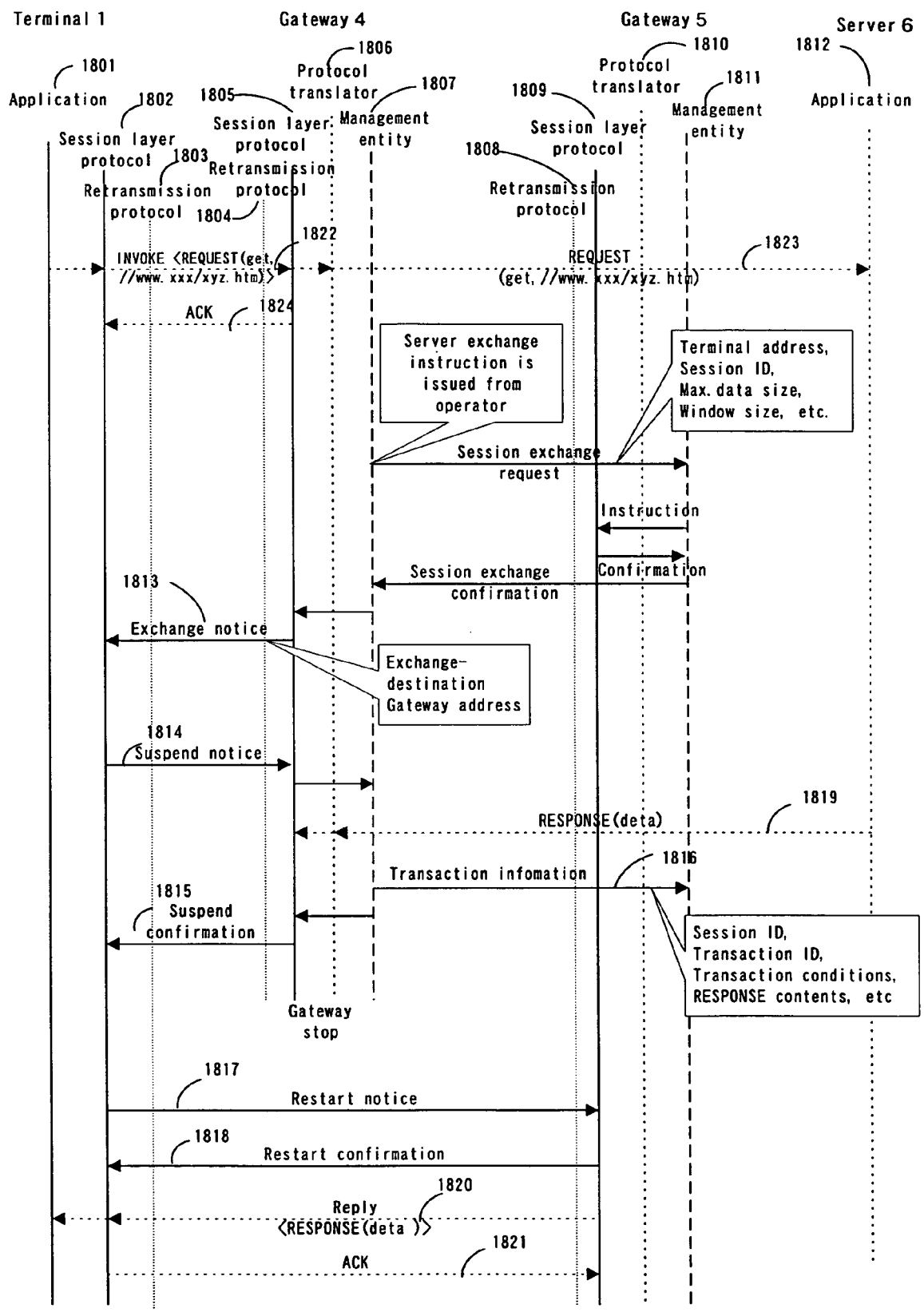
FIG. 22 shows a sequence of a transaction processing without receiving data in response to a request generated before the gateway exchange notice.

In FIG. 22, excluding the conditions without generating HTTP response from the sever 6 and ACk corresponding to said response from the terminal 1, the sequence up to the exchange notice 1813 is the same as in FIG. 19, which explanation are not described here.

The gateway 4 keeps the contents of REQUEST (get, //www,xxx/xyz,htm) 1823 sent to the server 6 till receiving the corresponding RESPONSE (data) 1819 from the server.

The session layer protocol 1802 in the terminal 1 receives the exchange notice 1813, and then sends the suspend notice 1814 to the session layer protocol 1805 in the gateway 4. The session layer protocol 1805 in the gateway 4 informs the management entity 1807 that the suspend notice 1814 has been received, and receives RESPONSE (data) 1819 corresponding to REQUEST (get, //www,xxx/xyz,htm) 1823 from the server 6. Thereby, the protocol translator 1806 in the gateway 4 can translate from the REQUEST (get, //www,xxx/xyz,htm) of HTTP command to the response of radio communication protocol (the data equivalent to REPLAY<RESPONSE (data)>1820 described after).

After this, the management entity 1811 in the gateway 5 receives the transaction information 1816 (the transaction conditions, transaction ID, and the contents of the translated REPLAY<RESPONSE (data)>) via the management entity 1807 in the gateway 4.

The following sequence of the suspend confirmation 1815 and the restart notice is the same as in FIG. 19, which explanation is omitted here. When the session between the session layer protocol 1802 in the terminal 1 and the session layer protocol 1809 in the gateway 5 restarts, the session layer protocol 1809 in the gateway 5 refers the transaction conditions and transaction ID received as the transaction information and sends REPLAY<RESPONSE (data)>1820 from the session layer protocol 1809 to the session layer protocol 1802 in the terminal 1.

The sequence of ACK of radio communication protocol is the same as in FIG. 19, which explanation is omitted here.

It may be arranged here that RESPONSE (data) 1819 sent from the server 6 is not translated by the protocol translator 1806 in the gateway 4, and sent from the management entity 1807 in the gateway 4 to the management entity 1811 in the gateway 5 as the transaction information 1816, and at last translated to REPLAY<RESPONSE (data)>1820 by the protocol translator 1810 in the gateway 5.

And in case that ACK is not sent out from the terminal 1, gateway 4 and 5, the same as the sequence without sending out ACK 1824 and 1821 can be performed. Therefore the step of ACK is not always required.

At this time, the same as the sequence shown in FIG. 21—that is, the contents of REQUEST is sent to the gateway 5 as the transaction information 1816 and the gateway 5 sends the HTTP command to the server 6—can be performed. And in case of the terminal 1 and the gateway 4 and 5 including the retransmission protocol the same sequence can be performed, too.

<The Case without ACK from the Terminal>

Figure 23:
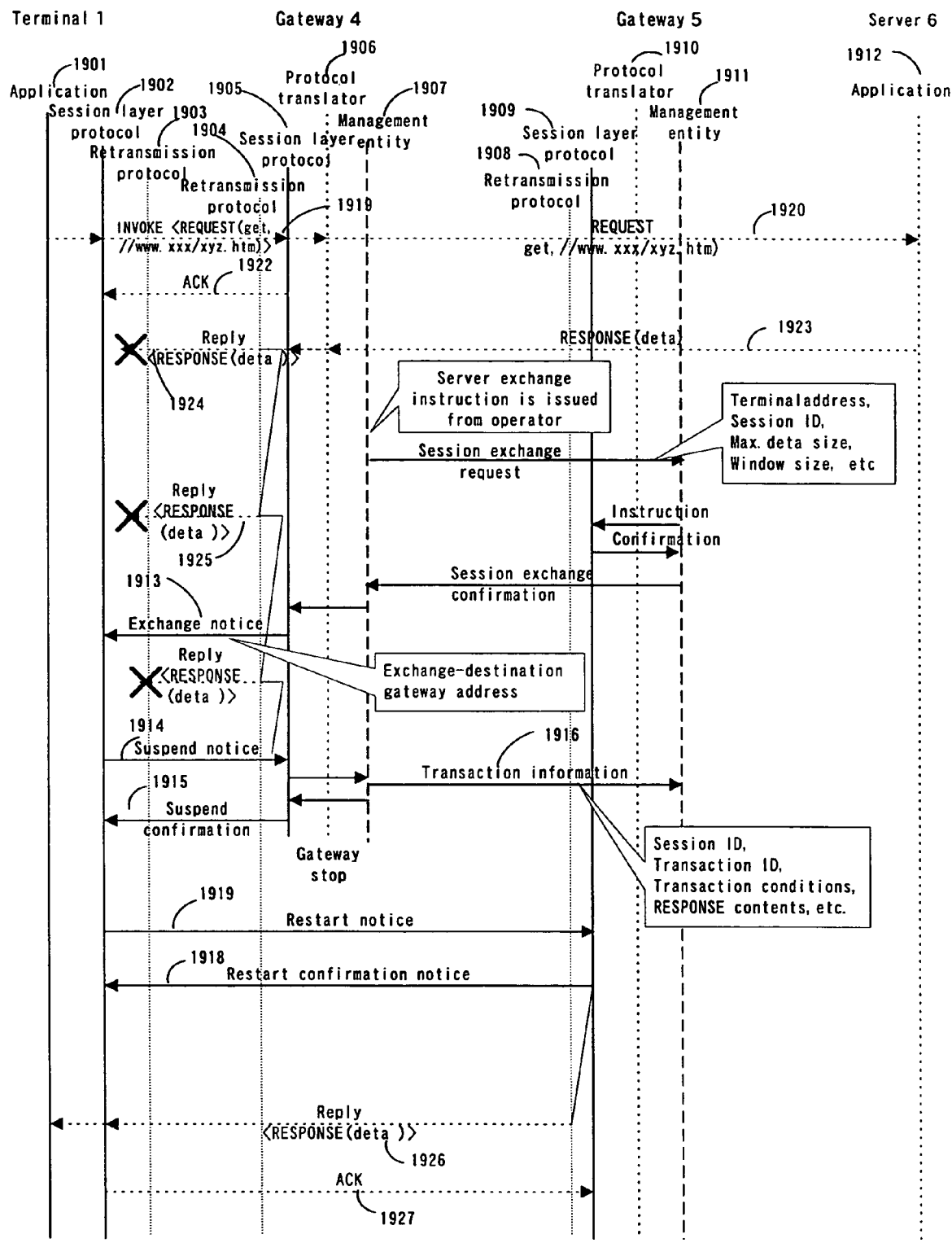
FIG. 23 shows a transaction of a transaction processing receiving data in response to a request generated before the gateway exchange notice.

With reference to FIG. 23, a sequence in case that the server exchange instruction generates from the operator of the gateway 4 when ACK of radio communication protocol is not send back from the terminal 1, though the gateway 4 has sent the response of radio communication protocol to the terminal after receiving the command of radio communication protocol from the terminal 1 and the response of HTTP from the server 6, said sequence will be explained hereinafter.

The sequence up to the exchange notice 1913 excluding that ACK corresponding to REPLAY<RESPONSE (data) >1924 are not sent to the gateway 4 from the terminal 1 is the same as in FIG. 19, which explanation is omitted here.

But during this time, the retransmission protocol 1904 in the gateway 4 performs the retransmission control on REPLAY<RESPONSE (data)>1924.

After receiving the exchange notice 1913, the session layer protocol 1902 in the terminal 1 sends the suspend notice 1914 to the session layer protocol 1905 in the gateway 5.

The session layer protocol 1905 in the gateway 5 informs the management entity 1907 that the suspend notice 1914 is received. The management entity 1907 sends to the management entity 1911 in the gateway 5 the transaction information including the transaction conditions, the frequency of retransmission of transaction ID, the progress value of retransmission timer, and the contents of REPLAY<RESPONSE (data)>.

The following sequence of the suspend confirmation 1915 and the restart notice is the same as in FIG. 19, which explanation is omitted here.

After the session between the session layer protocol 1902 in the terminal 1 and the session layer protocol 1909 in the gateway 5 restarts, the session layer protocol 1909 in the gateway 5 refers the transaction conditions, the frequency of retransmission of transaction ID, and the progress value of retransmission timer received as the transaction information 1916, and then sends the contents of RESPONSE (data) 1926 from the retransmission protocol 1908 to the session layer protocol 1902 in the terminal 1.

The sequence of ACK 1927 of radio communication protocol is the same as in FIG. 19, which explanation is omitted here.

Here, RESPONSE (data) 1923 has been translated temporarily to REPLAY<RESPONSE (data)> of radio communication protocol by the protocol translator 1906 in the gateway 4. However, when the management entity 1907 in the gateway 4 sends the transaction information 1916 to the management entity 1911 in the gateway 5, the contents of RESPONSE (data) is to be included in the transaction information 1916 in a format of HTTP protocol response, and then may be translated again to REPLAY<RESPONSE (data)>1926 of radio communication protocol by the protocol translator 1910 in the gateway 5.

The sequence, in case that the gateway 4 and 5 do not send ACK can be performed in the same way as in the sequence that ACK 1922 of radio communication protocol are not sent out.

The sequence in case of the terminal 1 and the gateway 5 including the retransmission protocol can be performed in the same way.

According to the sequence described above, even if the application in the terminal does not receive the data for request, it is possible to perform the gateway exchange of the terminal. Therefore, it is possible to perform the gateway connect exchange without much influence on the application in the terminal and the user.

Embodiment 5

Figure 5:
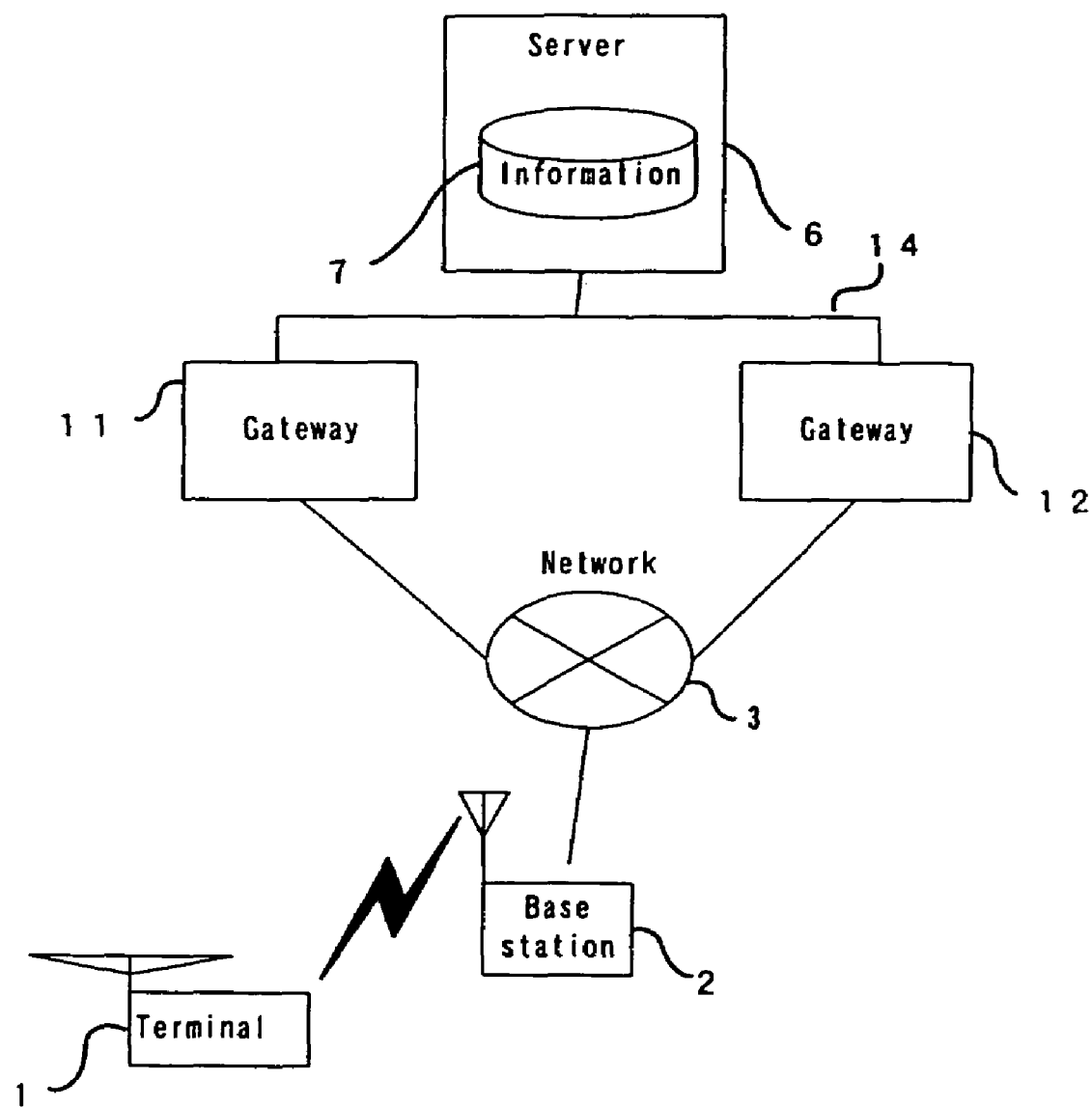
FIG. 5 is a constitutional view of a radio communication network via public network or in-house network with gateways sharing a common server in the embodiment of the conventional invention.
Figure 6:
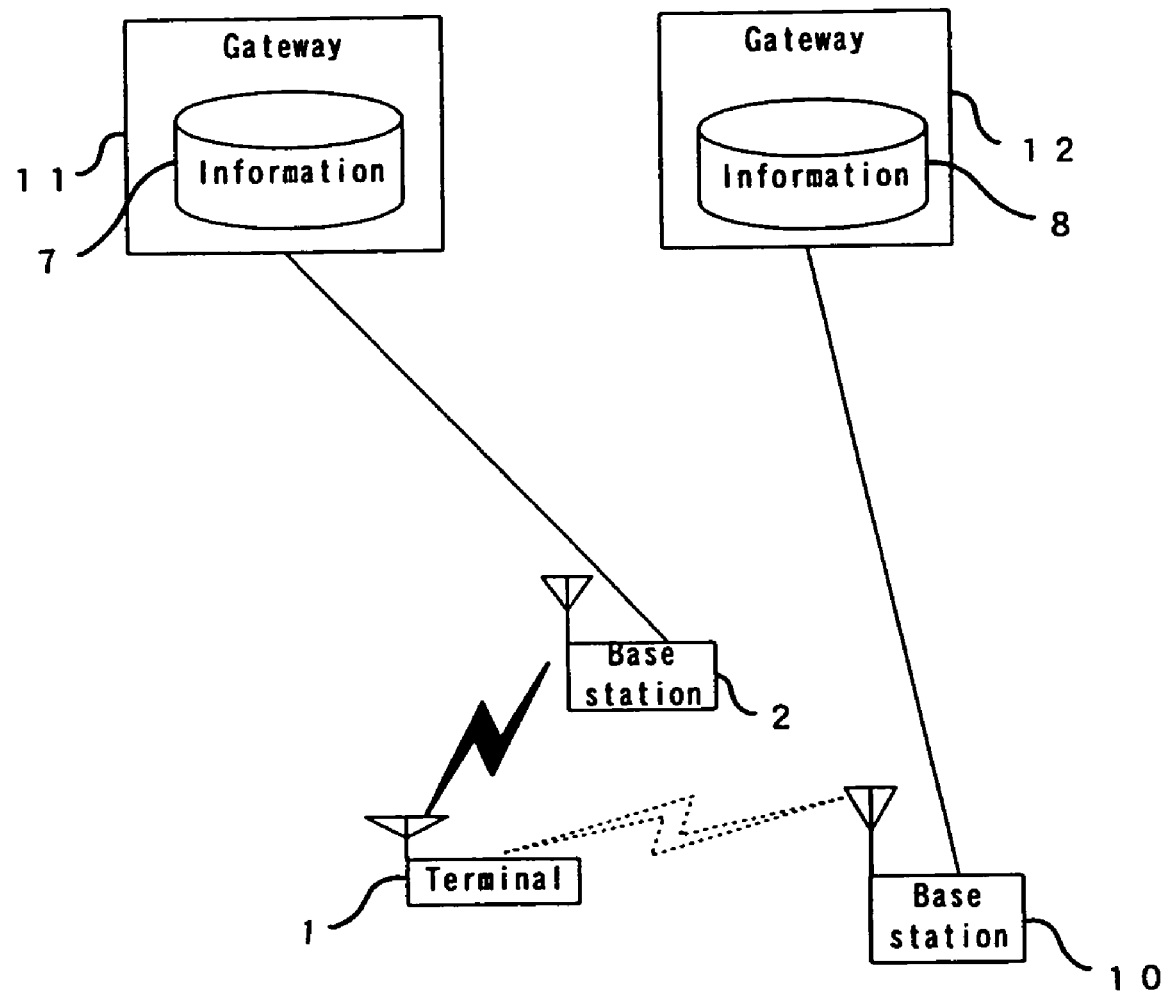
FIG. 6 is a constitutional view of a radio communication network via public network or in-house network with gateways themselves having information in the embodiment of the conventional invention.
Figure 7:
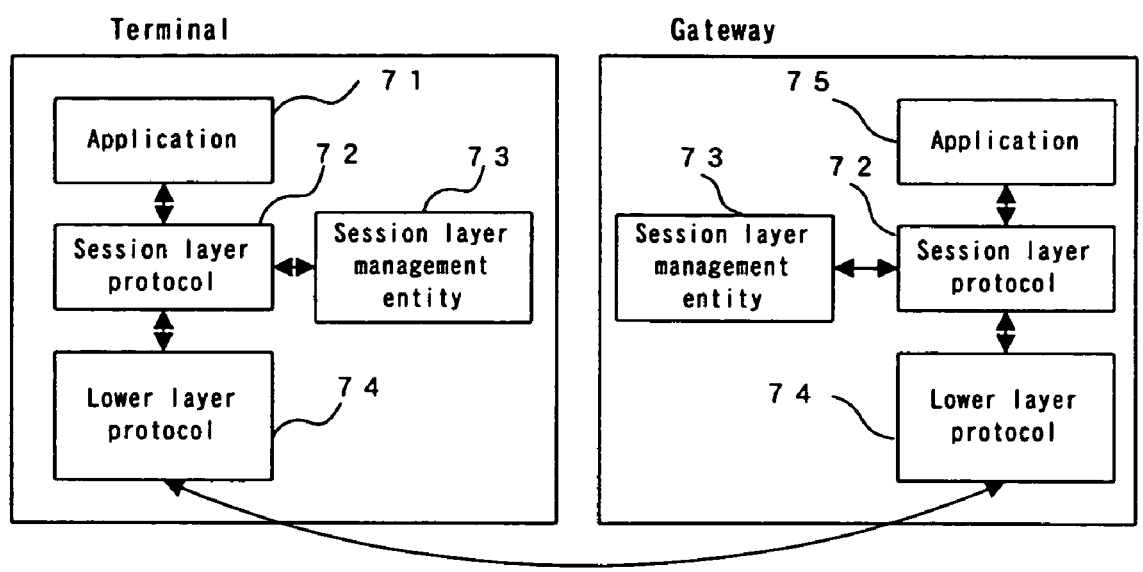
FIG. 7 is a diagram showing the positioning of the session layer protocol and the management entity at session layer in the protocol stack between the terminal and the gateway.
Figure 8:
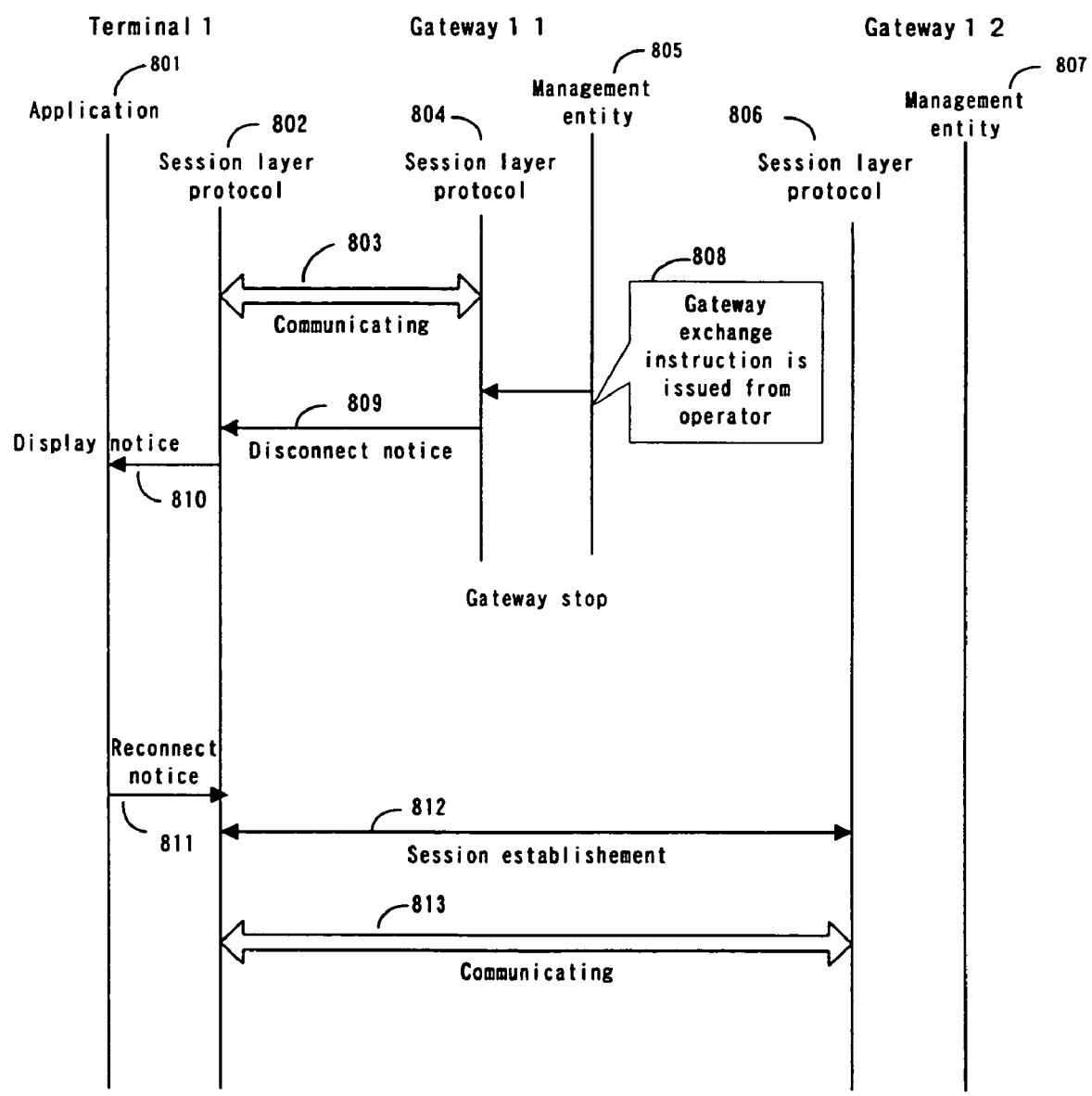
FIG. 8 shows a sequence of the gateway exchange in the conventional invention under the constitution shown in FIG. 6.

Even in an conventional structure shown in FIG. 5, for example, in case that there is not a connecting channel between gateways and the negotiation between gateways cannot be performed by the connecting means between gateways via network and the connecting means between a plural gateway and a server, it is possible to obtain effects by applying the present invention to these case.

Referring to FIGS. 5, 24, 25, 26, and 27, the gateway exchange sequence without the negotiation means between gateways will be explained in the embodiment 5. A gateway 11 and a gateway 12 share a server 6, thereby the server 6 is connected with the network 3. And the gateway 11 and 12 are not provided with a negotiation means between gateways. The terminal 1 is connected with the server 6 via a base station 2, the network 3 and the gateway 11 or 12, wherein the application is performed by using the information 7 in the sever 6.

The session layer protocol 2002 in the terminal 1 performs the communication with the application 2011 in the server 6 via the gateway 11 in order to execute the application 2001. AS the communication protocol used in the communication 2003 between the session layer protocol 2002 in the terminal 1 and the session layer protocol 2004 in the gateway 11 is different from in the communication 2007 between the session layer protocol 2004 in the gateway 11 and the server 6, the protocol translator 2005 in the gateway 11 performs the protocol translation.

The communication 2003 is translated to the communication protocol used in the communication 2007 between the gateway 11 and the server 6 by the protocol translator 2005, thereby it is possible to perform the communication between the terminal 1 and the server 6. But there is some type of application which do not require the protocol translation. In this case, the protocol translation is not performed in the gateway.

When the server exchange instruction 2002 is issued from the operator while the terminal 1 is in communication with the server 6, the management entity 2006 in the gateway 11 sends the exchange instruction 2013 to the session layer protocol 2004 in order that the communicating terminal 1 performs the connect exchange to the gateway 12.

After receiving the exchange notice 2014, the session layer protocol 2004 informs the session layer protocol 2002 in the terminal 1 of the information of the exchange-destination gateway address and etc. At this time, the selection of the exchange-destination gateway informed by the gateway 11 can be performed by searching the gateway with permissible capability for the terminal 1 according to the information of other gateways recorded in the gateway 11 in advance, and otherwise according to the instruction of the operator.

The first time the terminal 1 receives the exchange notice 2014, the termianl 1 can obtains the address information of the gateway 12 as the exchange-destination gateway. Namely the terminal 1 receives the information for the server connect exchange by the exchange notice 2014 from the gateway 11. Therefore, it is not necessary to always store the information of a plural gateway for the gateway connect exchange in the inside storage means of the terminal 1, for example, a hard disc, IC card, flash ROM, EEP ROM, and RAM with battery backup.

After receiving the exchange notice 2014, the session layer protocol 2002 in the terminal 1 sends the suspend notice 2015 to the session layer protocol 2004 in the gateway 11 at convenient timing for suspending the session, for example, at the time that the executing application 2001 is not in the communication with the application 2011 in the server 6.

The session layer protocol 2004 in the gateway 11 informs the management entity 2006 of the receipt of the suspend notice 2015, and the management entity 2006 sends the suspend instruction 2016 to the session layer protocol 2004 in the gateway 11.

After receiving the suspend instruction 2016, the session layer protocol 2004 in the gateway 11 sends the suspend confirmation 2017 to the session layer protocol 2002 in the terminal 1.

After that, the session layer protocol 2002 in the terminal 11 is suspended.

But the terminal 1, after sending the suspend notice 2015 to the session layer protocol 2004 in the gateway 11, can continue the server connect exchange sequence regardless of the conditions of the gateway 11.

Accordingly, it will be all right without the suspend instruction 2016 and the suspend confirmation 2017, or the session layer protocol 2004 may send the suspend confirmation 2017 to the session layer protocol 2002 in the terminal 1 independently without suspend instruction 2016. And there is a case that in some type of gateway 4 only the suspend instruction is send out without the suspend confirmation 2017.

In both case, if there is not the suspend confirmation 2017, the session of the terminal 1 is suspended after sending out the suspend instruction 2015. And it may be arranged as follows. When the session layer protocol 2002 in the terminal 1 receives the exchange notice 2014, the application 2001 is instructed to performs the gateway exchange display. According to the function of application 2001 or the user's instruction, the session layer protocol 2002 in the terminal 1 sends the suspend notice 2015 to the session layer protocol 2004 in the gateway 11.

The session layer protocol 2002 in the terminal 1 sends to the session layer protocol 2008 in the gateway 12 the restart notice including information of terminal addresses, session ID, maximum data size, window size and etc.

After receiving the restart notice 2018, the session layer protocol 2008 in the gateway 12 sends out the restart confirmation 2019. According to the restart confirmation 2019 from the session layer protocol 2008 in the gateway 12, the session of the suspended terminal 1 restarts.

After the session restarts, the session layer protocol 2002 in the terminal 1 performs the communication 2020 and 2021 with the application 2011 in the server 6 via the protocol translator 2009 in the gateway 12 in order to execute the application 2001.

It is assumed that the gateway 11 informs the terminal 1 of a gateway having the ability for accommodating the terminal 1 as a exchange-destination gateway in the sequences as described above. Therefore, in case of judging that the exchange-destination gateway does not have the capability for accommodating the terminal 1 after the connect exchange to the exchange-destination gateway, the connect exchange with bad efficiency will not occurs that the connect exchange to other gateway should be performed again. And it is possible to perform the gateway connect exchange without much influence on the application 2001 in the terminal and the user.

Figure 25:
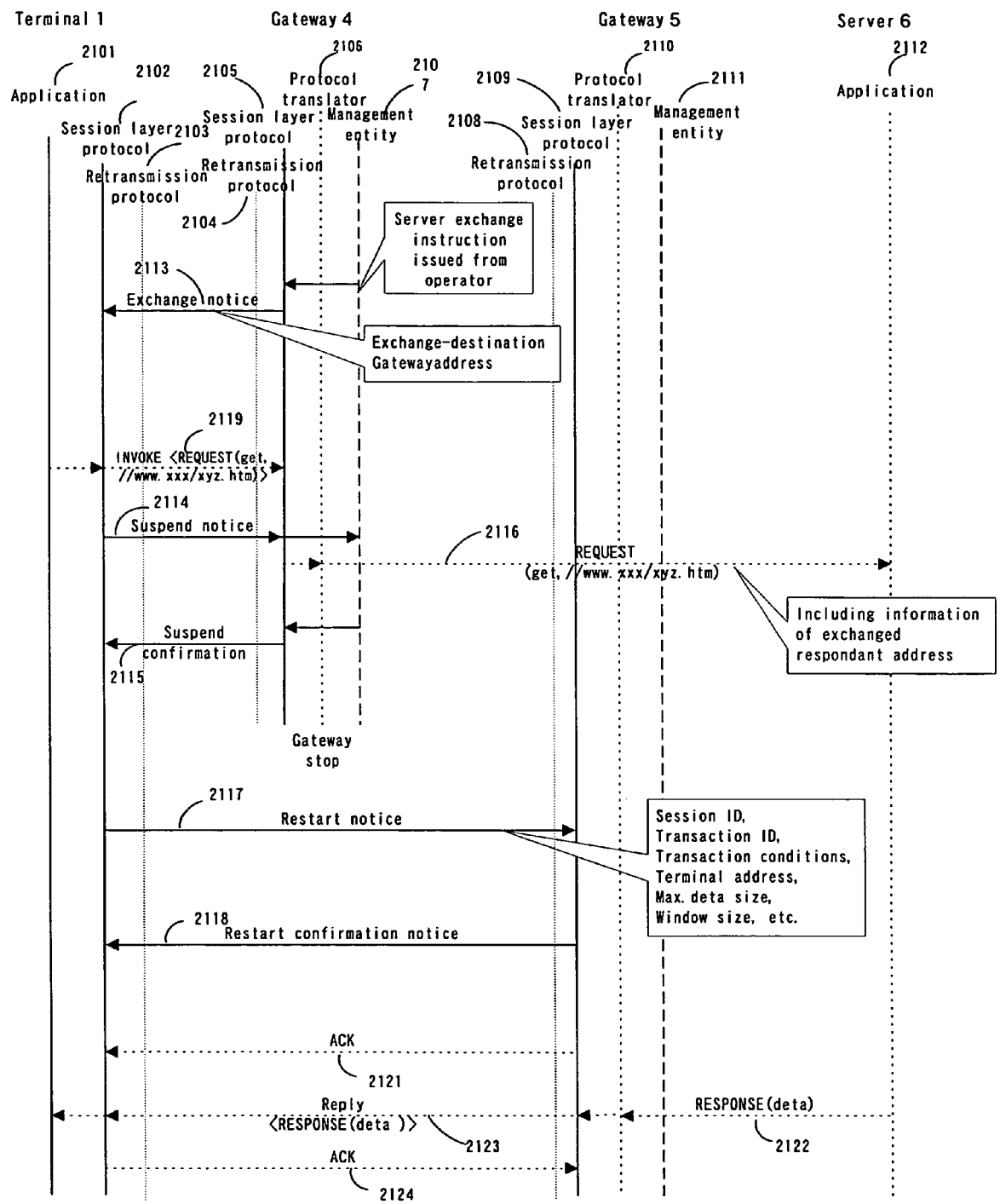
FIG. 25 shows a sequence of a transaction processing generated after the gateway exchange notice at the time of the gateway exchange described in Embodiment 5 of this invention.

Referring to FIG. 25, the sequence will be explained in case of generating a command of radio communication protocol from the terminal 1 immediately after the exchange notice 2113.

Figure 24:
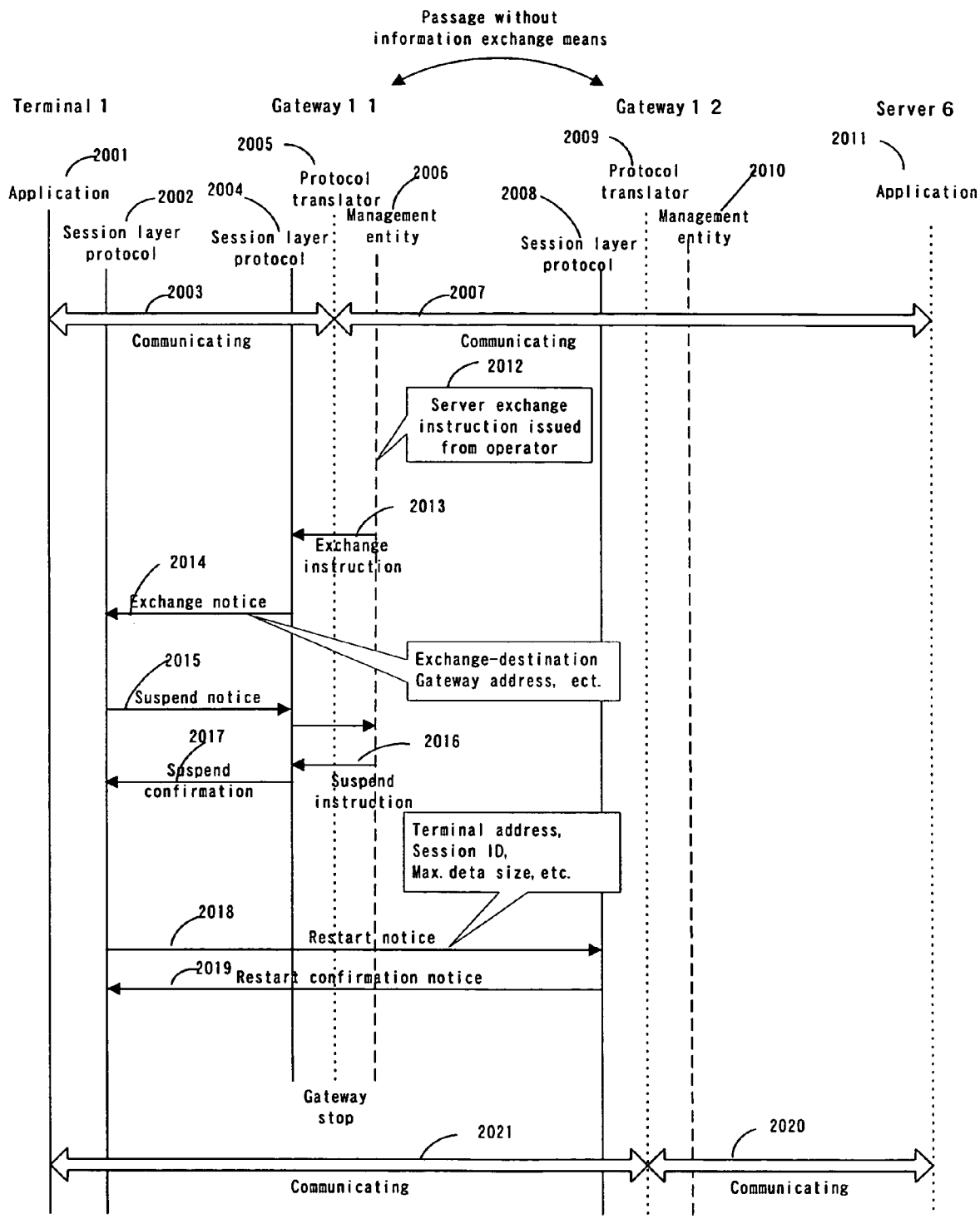
FIG. 24 shows a sequence of the gateway exchange in Embodiment 5 of this invention.

The sequence up to the exchange notice 2113 is the same as in FIG. 24, which explanation will not be described here.

The protocol translator 2016 in the gateway 4 is translated from INVOKE<REQUEST ((get, //www,xxx/xyz,htm)) >2119 of the radio communication protocol command to REQUEST (get, //www,xxx/xyz,htm) 2116 of HTTP command, and then sends it to the server 6. At the same time of informing the REQUEST (get, //www.xxx/xyz.htm) 2116 to the server 6, the gateway 4 also transmits the address of gateway to which RESPONSE (data) (here is shown as 2122) corresponding to said REQUEST (get, //www,xxx/xyz,htm) 2116 is sent.

The informed gateway address may be treated as a different information from the HTTP command as above, otherwise can be included in the HTTP command. In case of the gateway address included in HTTP command, the server 6 is to analize the HTTP command and then extract the gateway address.

The following sequence of the suspend confirmation 2115 and the restart notice is the same as in FIG. 24, which explanation will not described here.

After the session between the session layer protocol 2102 in the terminal 1 and the session layer protocol 2109 in the gateway 5 starts, the session layer protocol 2109 in the gateway 5 refers to the transaction conditions and transaction ID received at the restart notice 2117, and sends ACK 2121 of the radio communication protocol to the terminal 1. The gateway 5 receives from server 6 RESPONSE (data) 2122 of HTTP response corresponding to REQUEST ((get, //www,xxx/xyz,htm)) 2116 of HTTP command, which is translated to REPLAY<RESPONSE (data)>2123 of radio communication protocol response by the protocol translator 2110 and then sent to the session layer protocol 2102 in the terminal 1. At this time, ACK 2121 may be sent from the session layer protocol 2105 in the gateway 4 to the terminal 1.

The sequence from the next step to to ACK 2124 is the same as in FIG. 19, which explanation will not be described here.

Figure 26:
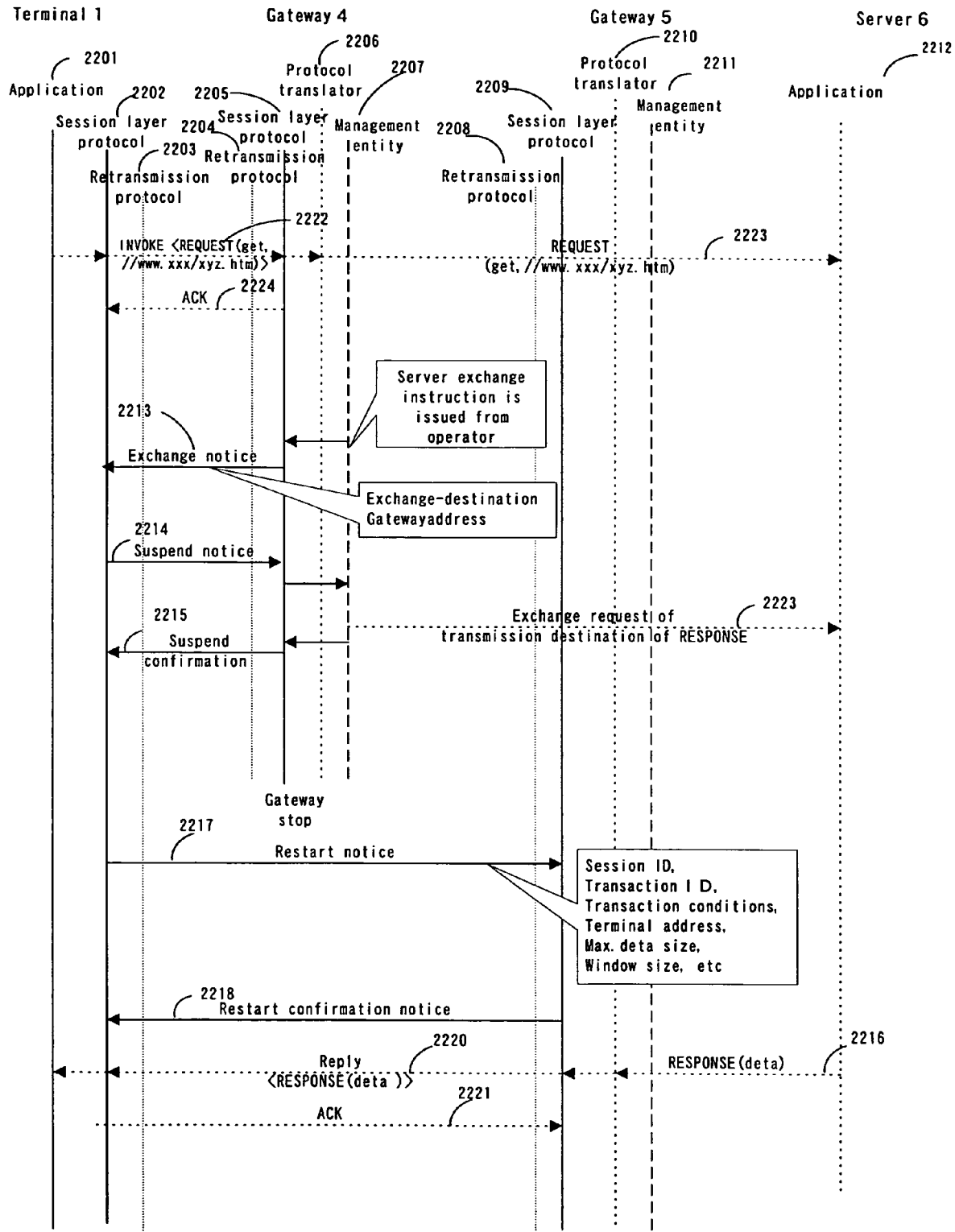
FIG. 26 shows a sequence of a transaction processing without receiving data in response to a request generated before the gateway exchange notice at the time of the gateway exchange described in Embodiment 5 of this invention.

Next, with reference to FIG. 26, here is explained about a sequence in case that the server exchange instruction has generated from the operator of the gateway 4, before the gateway 4 receives HTTP response corresponding to HTTP command from the server 6, said gateway had received INVOKE<REQUEST (get, //www,xxx/xyz,htm)>2222 of radio communication protocol command from the terminal 1, in response to it sent REQUEST (get, //www,xxx/xyz, htm) to the server 6 and at the same time, sent ACK2224 to the terminal 1.

The sequence up to the exchange notice 2213 is the same as in FIGS. 24 and 19, which explanation will not be described here.

The session layer protocol 2202 in the terminal 1 sends the suspend notice 2214 to the session layer protocol 2205 in the gateway 4 after receiving the exchange notice 2213.

The session layer protocol 2205 in the gateway 4 informs the management entity 2207 of the receipt of the suspend notice 2214, and the management entity 2207 in the gateway 4 sends to the server 6 the notice 2225 for transferring RESPONSE (data) 2216 to the gateway 5.

The sequence of the suspend confirmation 2215 and the restart notice after that is the same as in FIG. 24, which explanation will be not be described here.

After the session between the session layer protocol 2202 in the terminal 1 and the session layer protocol 2209 in the gateway 5 restars, the session layer protocol 2209 in the gateway 5 refers to the transaction conditions and transaction ID received by the restart notice 2217, translates RESPONSE (data) 2216 received from the server 6 to REPLAY<RESPONSE (data)>2220 by the protocol translator 2210, and then sends it to the terminal 1.

The sequence of ACK of radio communication protocol is the same as in FIG. 19, which explanation will not be described here.

Figure 27:
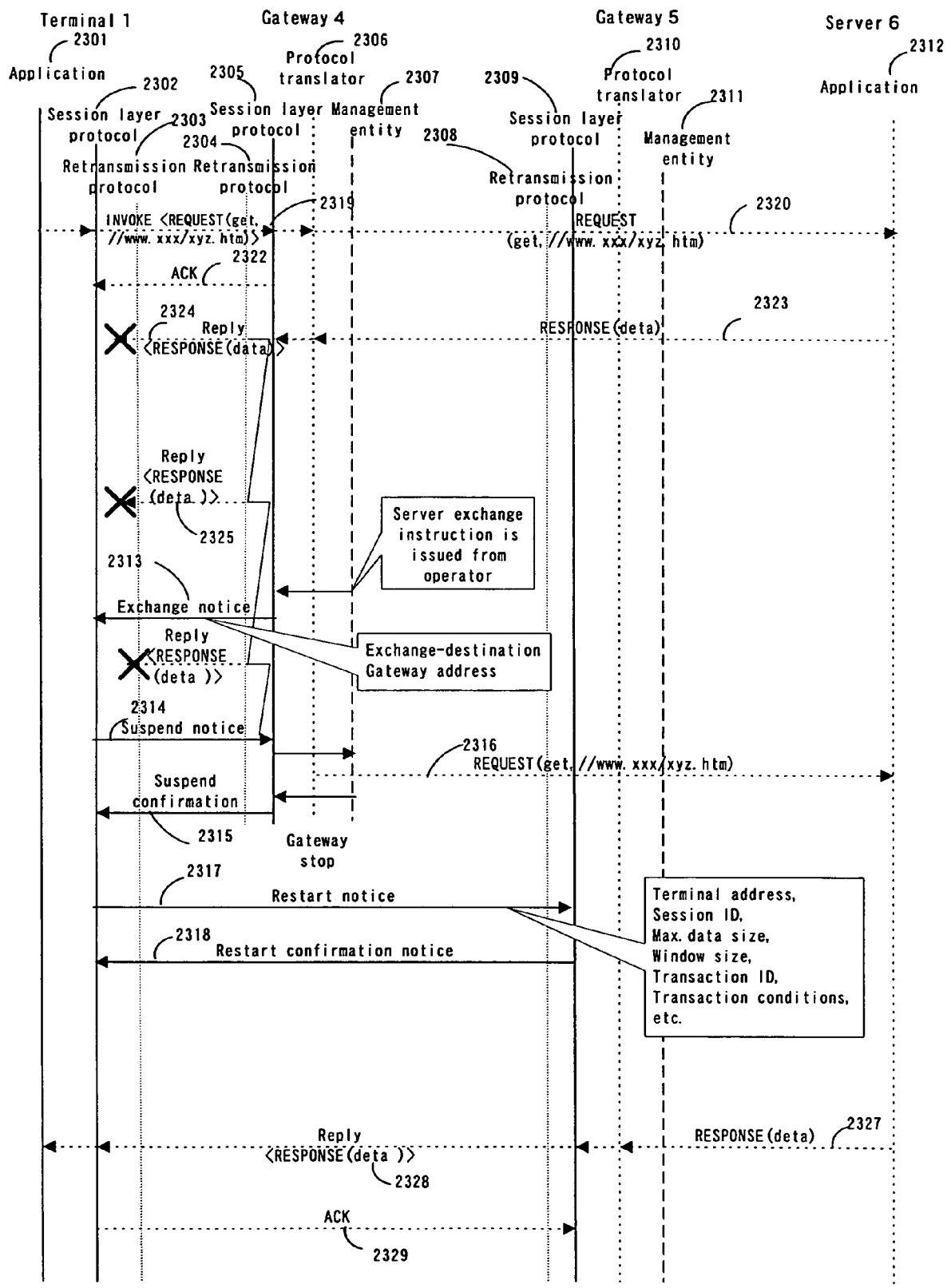
FIG. 27 shows a sequence of a transaction processing receiving data in response to a request generated before the gateway exchange notice at the time of the gateway exchange described in Embodiment 5 of this invention

Next, with reference to FIG. 27, here is explained about a sequence in case that the server exchange instruction generate from the operator of the server 4 when ACK of radio communication protocol does not turn back from the terminal, though the gateway 4 has received a radio communication protocol command from the terminal and HTTP response from the server 6, and also sent the response of radio communication protocol command to the terminal.

The sequence up to the exchange notice 2313 is the same as in FIGS. 19 and 22, which explanation is omitted here.

Figure 20:
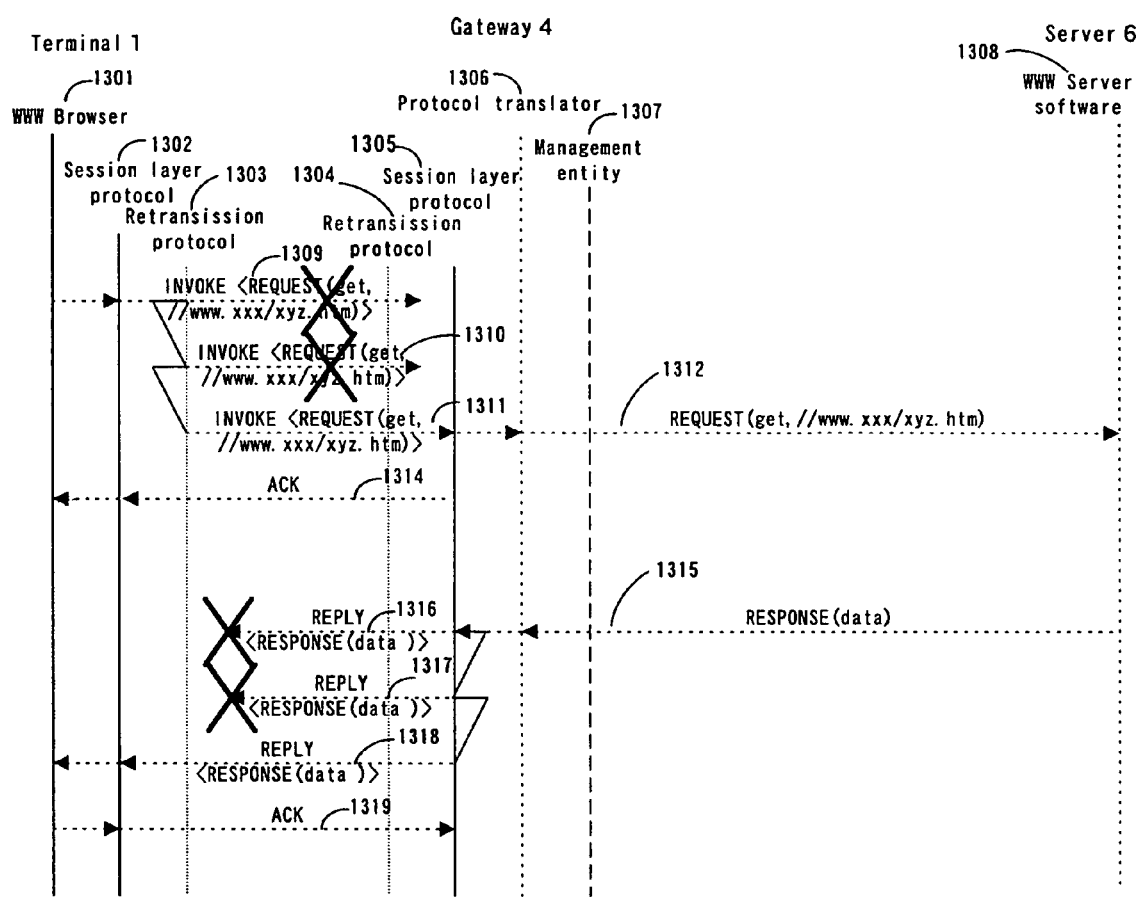
FIG. 20 shows a sequence of retransmission control of the gateway and the terminal in this invention.

But during this period, the retransmission control for REPLAY<RESPONSE (data)>2324 shown in FIG. 20 is performed by the retransmission protocol 2304 in the gateway 4.

The sequence shown in FIG. 27 will be explained after the next steps hereinafter.

At receiving the exchange notice 2313, the session layer protocol 2302 in the terminal 1 sends the suspend notice 2314 to the session layer protocol 2305 in the gateway 4.

The session layer protocol 2305 in the gateway 4 informs the management entity 2307 of the receipt of the suspend notice 2314.

The session layer protocol 2305 in the gateway 4 keeps the content of REQUEST (get, //www,xxx/xyz,htm) 2320 till receiving ACK 2329 from the terminal 1. Under these condition, the gateway 4 sends REQUEST (get, //www,xxx/xyz,htm) 2316 to the server 6.

At the same time of informing the RWQUEST (get, //www.xxx/xyz,htm) 2316 to the server 6, the gateway 4 also transmits the address of gateway to which RESPONSE (data) (here is shown as 2327) corresponding to said REQUEST get, //www,xxx/xyz,htm) 2316 is sent.

The informed gateway address may be treated as a different information from the HTTP command as above, otherwise can be included in the HTTP command. In case of the gateway address included in HTTP command, the server 6 is to analize the HTTP command and then extract the gateway address.

The sequence of the suspend confirmation 2315 and the restart notice after this is the same as in FIG. 24, which explanation will be not be described here.

After the session between the session layer protocol 2302 in the terminal 1 and the session layer protocol 2309 in the gateway 5 restarts, the session layer protocol 2209 in the gateway 5 refers to the transaction conditions and transaction ID received by the restart notice 2317, translates RESPONSE (data) 2327 received from the server 6 to REPLAY<RESPONSE (data)>2328 by the protocol translator 2310, and then sends it to the terminal 1.

The following sequence up to ACK in radio communication protocol is the same as in FIG. 19, which explanation will not be described here.

According to the sequences described above, even if there is not a negotiation means between gateways and the application in the terminal does not receive the data for request, it is possible to perform the gateway connect exchange of the terminal. Therefore, it is possible to perform the gateway connect exchange without much influences on the application in the terminal and the user.

Though it is arranged in the above embodiments that exchange-original gateway suspends after the connect exchange, but the "suspend" is not a necessary requisition and it is needless to say that the destination-original gateway may continue working.

It is assumed in the above embodiment that the terminal receives the exchange instruction during the time of receiving the services from the server, but this invention is not limited to this. Namely, even if the terminal is not receiving the above services, the original-gateway may send only the exchange notice to the terminal, and in addition to the exchange notice the information necessary for starting the communication with the exchange-destination gateway may be also sent to the terminal.

It is possible to obtain the profitable effect according to the present invention described above, that is, even when the gateway in connection with the terminal stops, the connect exchange negotiation between gateways can be performed before the stop of the gateway, accordingly without finishing the application being executed in the terminal it is possible to reconnect in a short time with other gateway having the capability for accommodating the terminal.

And even if the application does not receive the data for request, the gateway exchange can be performed. In other words, as the exchange-original gateway transfers the transaction conditions to the exchange-destination gateway, the terminal can perform the gateway exchange regardless of the transaction conditions.

If the connect exchange negotiation cannot be performed between the gateways directly, or the application does not receive the data for request, the gateway exchange can be performed. It is possible to reconnect with other gateway having the capability for accommodating the terminal in shorter time than usual.

In both case, it is not necessary for the terminal to always keeps the information of a plural gateway having capability for accommodating the terminal, therefore, it is easy for the terminal to meet the change of the network constitution.

What is claimed is:

1. A communication system which establishes a communication between a radio intelligent terminal and a server via a gateway:
   wherein the gateway is provided with an information notifying means, in response to receiving a gateway exchange instruction while the exchange-original gateway is relaying the communication between the radio intelligent terminal and the server, notifying the radio intelligent terminal of the information necessary for the communication between the radio intelligent terminal and the server via an exchange-destination gateway; and
   wherein the radio intelligent terminal is provided with a restart activating means, receiving from the exchange-original gateway the information necessary for the communication with the server via the exchange-destination gateway, and executing the restart sequence for the communication with the exchange-destination gateway while suspending the communication with the exchange-original gateway;
   the communication system further comprising an information exchange means, wherein if an incomplete transaction is left after the suspend processing of the communication with the exchange-original gateway, by said information exchange means the exchange-original gateway notifies the exchange-destination gateway of the information of the respondent to a request of the terminal before the restart sequence.

2. In the communication system as defined in claim 1, the incomplete transaction occurs in case that the request from the radio intelligent terminal to the server generates after the exchange-original gateway sends the exchange notice to the radio intelligent terminal, but said request does not arrive at the server.

3. In the communication system as defined in claim 1, the incomplete transaction occurs in case that the request generated from the radio intelligent terminal has arrived at the server before the exchange-original gateway sends the exchange notice to the radio intelligent terminal, and in response to said request the exchange-original gateway sends back ACK to the radio intelligent terminal.

4. In the communication system as defined in claim 1, the incomplete transaction occurs in case that the request from the radio intelligent terminal to the server generates before the exchange-original gateway sends the exchange notice to the radio intelligent terminal, and ACK in response to said request arrives at the exchange-original gateway at the suspend processing, but does not arrive at the radio intelligent terminal.

5. A gateway used in a communication system relaying a communication between a radio intelligent terminal and a server offering services to the radio intelligent terminal,
   wherein an exchange-original gateway is provided with an information notifying means notifying the radio intelligent terminal of the information necessary for the communication with an exchange-destination gateway; and
   wherein if an incomplete transaction is left at the suspend processing of the communication with the radio intelligent terminal, said exchange-original gateway notifying the server of the information of a respondent to the request of the terminal before the restart sequence.

6. In the gateway as defined in claim 5, the incomplete transaction occurs in case that the request from the radio intelligent terminal to the server generates after the exchange notice is sent to the radio intelligent terminal, but said request does not arrive at the server.

7. In the gateway as defined in claim 5, the incomplete transaction occurs in case that the request generated from the radio intelligent terminal has arrived at the server before the exchange notice is sent to the radio intelligent terminal, and ACK in response to said request is sent back to the radio intelligent terminal.

8. In the gateway as defined in claim 5, the incomplete transaction occurs in case that the request from the radio intelligent terminal to the server generates before the exchange notice is sent to the radio intelligent terminal, and ACK in response to said request does not arrive at the radio intelligent terminal at the suspend processing.

9. A communication system establishing a communication with a radio intelligent terminal and a server offering services to the radio intelligent terminal via a gateway,
   wherein the gateway is provided with the information exchanging means able to exchange between the exchange-original gateway and the exchange-destination gateway the information necessary for the communication between the server and the radio intelligent terminal via the exchange-destination gateway, in response to receiving a gateway exchange instruction from an operator while the exchange-original gateway is relaying the communication between the radio intelligent terminal and the server, and an information notifying means notifying the radio intelligent terminal of the information necessary for the communication with the exchange-destination gateway from the exchange-original gateway; and
   wherein the radio intelligent terminal is provided with a restart activating means receiving from the exchange-original gateway the information necessary for the communication with the server via exchange-destination gateway, and executing the restart sequence for the communication with the exchange-destination gateway while suspending the communication with the exchange-original gateway.

10. The communication system as defined in claim 9, wherein the radio intelligent terminal is provided with the restart activating means, in case that the information of communication conditions in the radio intelligent terminal is different from in the exchange-original gateway before and after the information exchange between the exchange-original gateway and the exchange-destination gateway by the information exchanging means, said means notifying from the radio intelligent terminal to the exchange-destination gateway of the information supplementing the incompatibility of communication conditions at the time of connecting the communication with the exchange-destination gateway.

11. The communication system as defined in claim 10, wherein the incompatibility occurs based on the communication between the radio intelligent terminal and the exchange-original gateway device, said communication generates for a period of the information exchange.

12. The communication system as defined in claim 9 comprising: the information exchanging means, if an incomplete transaction is left after the suspend processing of the communication with the exchange-original gateway, by said means the exchange-original gateway notifies the exchange-destination gateway of the information of the incomplete transaction before the restart sequence.

13. In the communication system as defined in claim 12, the incomplete transaction occurs in case that the request from the radio intelligent terminal to the server generates after the exchange-original gateway sends the exchange notice to the radio intelligent terminal, but said request does not arrive at the server.

14. In the communication system as defined in claim 12, the incomplete transaction occurs in case that the request generated from the radio intelligent terminal has arrived at the server before the exchange-original gateway sends the exchange notice to the radio intelligent terminal and in response to said request the exchange-original gateway sends back ACK to the radio communication terminal.

15. In the communication system as defined in claim 12, the incomplete transaction occurs in case that the request from the radio intelligent terminal to the server generates before the exchange-original gateway sends the exchange notice to the radio intelligent terminal, and ACK in response to said request arrives at the exchange-original gateway at the suspend processing, but does not arrive at the radio intelligent terminal.

16. The communication system as defined in claim 9, comprising:
the information exchanging means, wherein the information send from the exchange-original gateway to the exchange destination gateway contains the capability of the terminal, in case that the capability of the terminal cannot be accommodated by the exchange-destination gateway, said means notifying from the exchange-destination gateway to the exchange-original gateway of the capability that the exchange-destination gateway can offer to the terminal.

17. The communication system as defined in claim 16, comprising: the information notifying means notifying the terminal of the capability of the exchange-destination gateway together with the exchange notice; and
the judgment means in the radio intelligent terminal judging whether the communication with the exchange-destination gateway should restart or not according to the informed capability.

18. The communication system as defined in claim 16, comprising:
the judgment means in the exchange-original gateway judging if it is possible to perform the communication with the terminal based on the capability of the exchange-destination gateway, and if impossible, stopping the exchange-original gateway.

19. The communication system as defined in claim 9, comprising:
the information exchanging means, if the first nominated exchange-destination gateway rejects the exchange, said means executing the information exchange with other nominated exchange-destination gateway.

20. A gateway used in a communication system relaying the communication between a radio intelligent terminal and a server offering services to the radio intelligent terminal, wherein the exchange-original gateway is provided with:
an information exchanging means, in response to receiving a gateway exchange instruction from an operator while the exchange-original gateway is relaying from the radio intelligent terminal to the server, said means able to exchange with the exchange-destination gateway the information necessary for the communication between the radio intelligent terminal and the server via exchange-destination gateway; and
an information notifying means notifying the radio intelligent terminal of the information necessary for the communication with the exchange-destination gateway.

21. The gateway at exchange-original side as defined in claim 20, comprising:
the information exchanging means, if an incomplete transaction is left after the suspend processing of the communication with the radio intelligent terminal, by said means the exchange-original gateway notifies the exchange-destination gateway of the information of the transaction before the restart sequence of the radio intelligent terminal.

22. The gateway as defined in claim 21, wherein the incomplete transaction occurs in case that the request from the radio intelligent terminal to the server generates after the exchange notice is sent to the radio intelligent terminal, but said request does not arrive at the server.

23. The gateway as defined in claim 21, wherein the incomplete transaction occurs in case that the request generated from the radio intelligent terminal has arrived at the server before the exchange notice is sent to the radio intelligent terminal, and ACK in response to said request is sent back to the exchange-original gateway from the server after the suspend processing.

24. The gateway as defined in claim 21, wherein the incomplete transaction occurs in case that the request from the radio intelligent terminal to the server generates before the exchange notice is sent to the radio intelligent terminal, and ACK in response to said request does not arrive at the radio intelligent terminal at the time of the suspend processing.

25. A radio intelligent terminal which establishes a communication with a server offering to services via gateway, comprising:
a restart activating means, in response to receiving an gateway exchange instruction from an operator while the exchange-original gateway is relaying from the radio intelligent terminal to the server, said means receiving from the exchange-original gateway the information necessary for the communication with the server via exchange-destination gateway together with the exchange notice, and executing the restart sequence for the communication with the exchange-destination gateway while suspending the communication with the exchange-original gateway;

wherein, in case that there is a incompatibility in the communication conditions with the exchange-original gateway before and after the information necessary after the exchange is exchanged between the exchange-original gateway and the exchange-destination gateway, the information supplementing the incompatibility is sent to the exchange-destination gateway by the restart sequence.

26. A communication method which establishes a radio intelligent terminal and a server offering services to the radio intelligent terminal via a gateway, comprising following steps:

notifying from the exchange-original gateway to the exchange-destination gateway of the information necessary for the communication between the radio communication terminal and the server via the exchange-destination gateway in response to receiving a gateway exchange instruction from an operator while the exchange-original gateway is relaying the communication between the radio intelligent terminal and the server;

notifying from the exchange-original gateway to the radio intelligent terminal of the information necessary for the communication with the exchange-destination gateway; and executing the restart sequence for the communication with the exchange-destination gateway along with suspending the communication with the exchange-original gateway by the radio intelligent terminal which receives the information necessary for the communication with the server via the exchange-destination gateway.

* * * * *